US012340142B1

(12) United States Patent
Littel et al.

(10) Patent No.: US 12,340,142 B1
(45) Date of Patent: Jun. 24, 2025

(54) MEDIA STREAMING TO AUGMENTED REALITY GLASSES OVER A LOCAL NETWORK

(71) Applicant: Snap Inc., Santa Monica, CA (US)

(72) Inventors: Jeremy Littel, Seattle, WA (US); Dmitry Sobinov, Rockdale (AU)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/504,031

(22) Filed: Nov. 7, 2023

Related U.S. Application Data

(60) Provisional application No. 63/479,514, filed on Jan. 11, 2023.

(51) Int. Cl.
*G06F 3/14* (2006.01)
*G06F 3/01* (2006.01)

(52) U.S. Cl.
CPC ............ *G06F 3/1454* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 7,971,156 B2 | 6/2011 | Albertson et al. |
| 7,996,793 B2 | 8/2011 | Latta et al. |
| 8,487,938 B2 | 7/2013 | Latta et al. |
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |

(Continued)

FOREIGN PATENT DOCUMENTS

| | | | | |
|---|---|---|---|---|
| CN | 103049761 B | 8/2016 | | |
| CN | 110869889 A | * | 3/2020 | ........... G02B 27/017 |

(Continued)

OTHER PUBLICATIONS

"VITURE One—Game and Stream Anywhere, Anytime", Kickstarter, [Online]. Retrieved from the Internet: <URL: https://web.archive.org/web/20230110181733/https://www.kickstarter.com/projects/viture/viture-game-and-stream-anywhere-anytime>, (Jan. 9, 2023), 5 pgs.

(Continued)

*Primary Examiner* — Duane N Taylor, Jr.
(74) *Attorney, Agent, or Firm* — SCHWEGMAN LUNDBERG & WOESSNER, P.A.

(57) ABSTRACT

The subject technology receives, by one or more hardware processors implementing a local wireless network, a request from a client device to mirror media content displayed on a screen of the client device on a wearable device. In response to the request, the subject technology causes a display of the media content in a mirroring lens of the wearable device. While the media content is being displayed in the mirroring lens of the wearable device, the subject technology tracks hand gestures of a user wearing the wearable device and viewing the media content displayed in the mirroring lens of the wearable device. The subject technology processes navigational or manipulation data based on the tracked hand gestures and sends a navigation or manipulation instruction to the client device or a mirroring lens processor of the wearable device based on the tracked hand gestures.

19 Claims, 19 Drawing Sheets

(56) References Cited

U.S. PATENT DOCUMENTS

| | | |
|---|---|---|
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,868,531 B1 * | 1/2024 | Tasci .................... G06N 20/00 |
| 2009/0012788 A1 | 1/2009 | Gilbert et al. |
| 2011/0301934 A1 | 12/2011 | Tardif |
| 2014/0171036 A1 | 6/2014 | Simmons |
| 2015/0120293 A1 | 4/2015 | Wohlert et al. |
| 2015/0370320 A1 | 12/2015 | Connor |
| 2017/0123487 A1 | 5/2017 | Hazra et al. |
| 2017/0236330 A1* | 8/2017 | Seif .................... G06F 3/04842 |
| | | 345/633 |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0158370 A1 | 6/2018 | Pryor |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2023/0185513 A1* | 6/2023 | Liu .................... G06F 3/0346 |
| | | 345/520 |

FOREIGN PATENT DOCUMENTS

| | | | |
|---|---|---|---|
| CN | 112947758 A | * | 6/2021 |
| EP | 3707693 A1 | | 9/2020 |
| WO | WO-2016168591 A1 | | 10/2016 |
| WO | WO-2019094618 A1 | | 5/2019 |

OTHER PUBLICATIONS

"Agora Real-Time Voice and Video Engagement", [Online]. Retrieved from the Internet: <URL: https://web.archive.org/web/20230111202940/https://www.agora.io/en/>, (Archived on Jan. 11, 2023), 16 pgs.

"Airplay server detection protocol . . .", Apple Developer Forums, [Online]. Retrieved from the Internet: < URL: https://developer.apple.com/forums/thread/66007>, (Oct. 2016), 2 pgs.

"App Extensions Overview", Apple Developer, [Online]. Retrieved from the Internet: <URL: https://web.archive.org/web/20221022162245/https://developer.apple.com/app-extensions/>, (Archived on Oct. 22, 2022), 4 pgs.

"AudioManager", Android Developers, [Online]. Retrieved from the Internet: <URL: https://developer.android.com/reference/android/media/AudioManager>, (Last updated Feb. 13, 2025), 166 pgs.

"ReplayKit", Apple Developer Documentation, [Online]. Retrieved from the Internet: <URL: https://web.archive.org/web/20220407130844/https://developer.apple.com/documentation/replaykit>, (Archived on Apr. 7, 2022), 2 pgs.

"RPSystemBroadcastPickerView", Apple Developer, [Online] Retrieved from the Internet: <URL: https://web.archive.org/web/20220627084731/https://developer.apple.com/documentation/replaykit/rpsystembroadcastpickerview>, (Archived on Jun. 27, 2022), 4 pgs.

"Serezhka / java-airplay-server—Acts like Apple TV", Github, [Online] Retrieved from the Internet: <URL: https://github.com/serezhka/java-airplay-server/>, (Dec. 14, 2022), 3 pgs.

"Snapchat / djinni—A tool for generating cross-language type declarations and interface bindings.", GitHub, [Online]. Retrieved from the Internet: <URL: https://web.archive.org/web/20220829192530/https://github.com/Snapchat/djinni>, (Archived on Aug. 29, 2022), 11 pgs.

"STUN", Wikipedia, [Online]. Retrieved from the Internet: <URL: https://en.wikipedia.org/w/index.php?title=STUN&oldid=1096426898>, (Jul. 4, 2022), 4 pgs.

"Traversal Using Relays around NAT", Wikipedia, [Online]. Retrieved from the Internet: <URL: https://en.wikipedia.org/w/index.php?title=Traversal_Using_Relays_around_NAT&oldid=1115742687>, (Oct. 13, 2022), 3 pgs.

"WWDC18 Videos", Apple Developer, [Online]. Retrieved from the Internet: <URL: https://web.archive.org/web/20220831052829/https://developer.apple.com/videos/wwdc2018>, (Archived on Aug. 31, 2022), 21 pgs.

Robertson, Adi, "Nreal's $379 AR glasses launch in the US today", The Verge, [Online]. Retrieved from the Internet: <URL: https://www.theverge.com/2022/9/27/23373228/nreal-air-ar-glasses-streaming-video-us-launch-pricing-amazon>, (Sep. 27, 2022), 7 pgs.

* cited by examiner

MEDIA STREAMING TO AUGMENTED REALITY GLASSES OVER A LOCAL NETWORK

CLAIM OF PRIORITY

This patent application claims the benefit of priority, under 35 U.S.C. Section 119(e), to Littel et al, U.S. Provisional Patent Application Ser. No. 63/479,514, entitled "MEDIA STREAMING TO AUGMENTED REALITY GLASSES OVER A LOCAL NETWORK," filed on Jan. 11, 2023, which is hereby incorporated by reference herein in its entirety.

TECHNICAL FIELD

The present disclosure relates generally to wearable devices, including a wearable device which includes a waveguide-based display. The present disclosure also relates to mirroring augmented reality content in a wearable device, and to mirroring and navigating augmented reality content in messaging systems. More specifically, some examples enable manipulation of a mirrored 2D phone display using hand tracking in a 3D augmented reality space presented in glasses.

BACKGROUND

With the increased use of digital images, affordability of portable computing devices, availability of increased capacity of digital storage media, and increased bandwidth and accessibility of network connections, digital images have become a part of the daily life for an increasing number of people.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
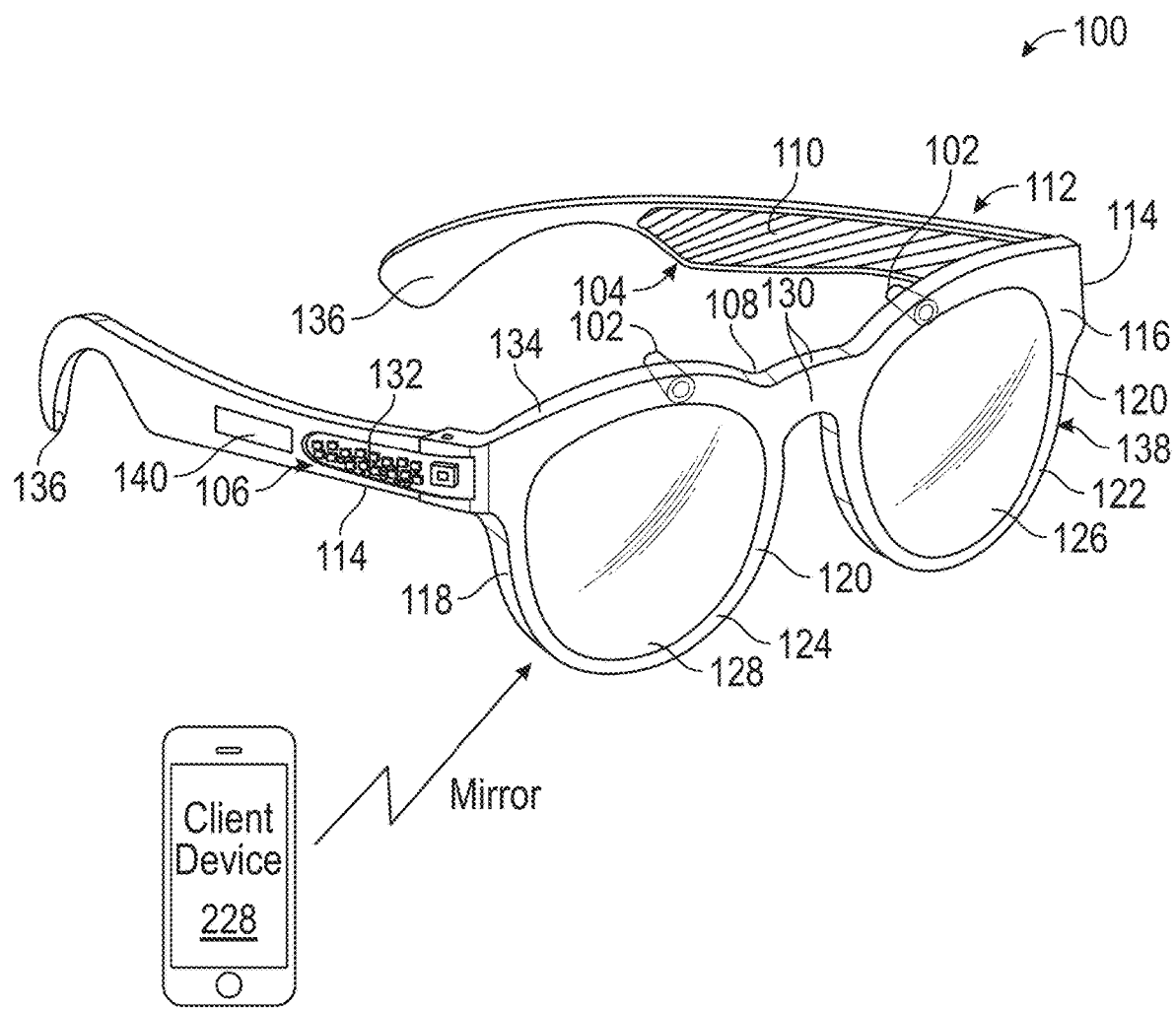
FIG. 1 is a perspective view of a wearable device, in accordance with some example embodiments.

Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

Augmented reality technology aims to bridge a gap between virtual environments and a real-world environment by providing an enhanced real-world environment that is augmented with electronic information. As a result, the electronic information appears to be part of the real-world environment as perceived by a user. In an example, augmented reality technology further provides a user interface to interact with the electronic information that is overlaid in the enhanced real-world environment.

As mentioned above, with the increased use of digital images, affordability of portable computing devices, availability of increased capacity of digital storage media, and increased bandwidth and accessibility of network connections, digital images have become a part of the daily life for an increasing number of people. Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

Augmented reality technology aims to bridge a gap between virtual environments and a real-world environment by providing an enhanced real-world environment that is augmented with electronic information. As a result, the electronic information appears to be part of the real-world environment as perceived by a user. In an example, augmented reality technology further provides a user interface to interact with the electronic information that is overlaid in the enhanced real-world environment.

An augmented reality (AR) system enables real and virtual environments to be combined in varying degrees to facilitate interactions from a user in a real-time manner. Such an AR system, as described herein, therefore can include various possible combinations of real and virtual environments, including augmented reality that primarily includes real elements and is closer to a real environment than a virtual environment (e.g., without real elements). In this manner, a real environment can be connected with a virtual environment by the AR system. A user immersed in an AR environment can navigate through such an environment, and the AR system can track the user's viewpoint to provide a visualization based on how the user is situated in the environment. Augmented reality (AR) experiences can be provided in a messaging client application (or the messaging system) as described in embodiments herein.

Embodiments of the subject technology described herein enable various operations involving AR content for capturing, mirroring, modifying, and navigating such content with a given electronic device, such as a mobile computing device, or a wearable device, such as spectacles. Some embodiments herein relate generally to wearable devices, including a wearable device which includes a waveguide-based display such as glasses. The present disclosure also relates to mirroring augmented reality content in a wearable device, and to mirroring and navigating augmented reality content in messaging systems. More specifically, some examples use hand tracking to enable manipulation of a mirrored 2D phone display in a 3D augmented reality space presented in glasses.

Messaging systems are frequently utilized and are increasingly leveraged by users of mobile computing devices, in various settings, to provide different types of functionality in a convenient manner. As described herein, the subject messaging system comprises practical applications that provide improvements in capturing and mirroring image data and rendering AR content (e.g., images, videos, and the like) based on the captured image data by at least providing technical improvements with capturing image data using power- and resource-constrained electronic devices. Such improvements in capturing and mirroring image data are enabled by techniques provided by the subject technology, which reduce latency and increase efficiency in processing captured image data thereby also reducing power consumption in the capturing devices.

As discussed further herein, the subject infrastructure supports the creation and sharing of interactive media, referred to herein as messages, including 3D content or AR effects, throughout various components of a messaging system. In example embodiments described herein, messages can enter the system from a live camera or via storage (e.g., where messages including 3D content and/or AR effects are stored in memory or a database). The subject system supports motion sensor input, and loading of external effects and asset data.

As referred to herein, the phrase "augmented reality experience," "augmented reality content item," "augmented reality content generator" includes or refers to various image processing operations corresponding to an image modification, filter, AR content generators, media overlay, transformation, and the like, and additionally can include playback of audio or music content during presentation of AR content or media content, as described further herein.

Example Wearable Device

A wearable device implemented with a transparent or semi-transparent display enables a user to see through the transparent or semi-transparent display to view the surrounding environment. In addition, the wearable device may enable the user to see objects (e.g., virtual objects such as images, video, text, etc.) that are generated for display to appear as a part of, and/or overlaid upon, the surrounding environment. Such a wearable device may provide an augmented reality experience for the user.

The disclosed embodiments provide for a wearable device which includes an integrated display for displaying objects (e.g., virtual objects). The integrated display includes a waveguide, which receives a light beam from a projector. In addition, the waveguide includes an input coupler for receiving the light beam from the projector, a pupil replication element with diffractive structures for replicating the light beam, and an output coupler for providing the replicated light beam as output to a user.

The diffractive structures of the pupil replication element include a smooth or stepwise gradient or a graduated coating that increases in thickness across the diffractive structures. The gradient in coating or graduated coating is thinner for those diffractive structures closest to the input coupler. The thinner coating provides for the coated diffractive structures to be less efficient in transferring light to the user, and to propagate more light to subsequent diffractive structures. The gradient in coasting or graduated coating increases in thickness as the diffractive structures become farther away from the input coupler. The thicker coating provides for those coated diffractive structures to be more efficient in transferring light to the user, and to propagate less light to subsequent structures. By virtue of the gradient in coating or graduated coating applied across the diffractive structures, it is possible to achieve a more consistent efficiency and/or uniformity response over the entire eye box of the waveguide, for an improved visual experience with respect to displayed objects (e.g., virtual objects).

FIG. 1 is perspective view of a wearable device (e.g., glasses 100), in accordance with some example embodiments. The glasses 100 can include a frame 112 made from any suitable material such as plastic or metal, including any suitable shape memory alloy. In one or more embodiments, the frame 112 includes a front piece 138 including a first optical left optical element holder 122 (e.g., a display or lens holder) and a second or right optical element holder 124 connected by a bridge 130. The front piece 138 additionally includes a left end portion 116 and a right end portion 118. A first or left optical element 126 and a second or right optical element 128 can be provided within respective left optical element holder 122 and right optical element holder 124. Each of the right optical element 128 and the left optical element 126 can be a lens, a display, a display assembly or a combination of the foregoing. Any of the display assemblies disclosed herein can be provided in the glasses 100.

The frame 112 additionally includes a left arm or temple piece 104 and a right arm or temple piece 106 coupled to the respective left end portion 116 and the right end portion 118 of the front piece 138 by any suitable means such as a hinge (not shown), so as to be coupled to the front piece 138, or rigidly or flexibly secured to the front piece 138 so as to be integral with the front piece 138. In one or more implementations, each of the temple piece 104 and the temple piece 106 includes a first portion 114 that is coupled to the respective left end portion 116 or right end portion 118 of the front piece 138 and any suitable second portion 136 for coupling to the ear of the user. In one embodiment, the front piece 138 can be formed from a single piece of material, so as to have a unitary or integral construction. In one embodiment, such as illustrated in FIG. 1, the entire frame 112 can be formed from a single piece of material so as to have a unitary or integral construction.

The glasses 100 can include a computing device, such as a computer 132, which can be of any suitable type so as to be carried by the frame 112 and, in one or more embodiments, of a suitable size and shape, so as to be at least partially disposed in one of the temple piece 104 and the temple piece 106. In one or more embodiments, as illustrated in FIG. 1, the computer 132 is sized and shaped similar to the size and shape of one of the temple piece 106 (e.g., or the temple piece 104), and is thus disposed almost entirely if not entirely within the structure and confines of such temple piece 106. In one or more embodiments, the computer 132 is disposed in both of the temple piece 104 and the temple piece 106. The computer 132 can include one or more hardware processors with memory, wireless communication circuitry, and a power source. As discussed below, the computer 132 comprises low-power circuitry, high-speed circuitry, and a display processor. Various other embodiments may include these elements in different configurations or integrated together in different ways. Additional details of aspects of computer 132 may be implemented as illustrated by the camera device 202 discussed below.

The computer 132 additionally includes a battery 110 or other suitable portable power supply. In one embodiment, the battery 110 is disposed in one of the temple piece 104 or the temple piece 106. In the glasses 100 shown in FIG. 1, the battery 110 is shown as being disposed in left temple piece 104 and electrically coupled using the connection 134 to the remainder of the computer 132 disposed in the right temple piece 106. The glasses 100 can include a connector or port (not shown) suitable for charging the battery 110 accessible from the outside of frame 112, a wireless receiver, transmitter or transceiver (not shown) or a combination of such devices.

In one or more implementations, the glasses 100 include cameras 102. Although two cameras are depicted, other embodiments contemplate the use of a single or additional (i.e., more than two) cameras. In one or more embodiments, the glasses 100 include any number of input sensors or peripheral devices in addition to the cameras 102. The front piece 138 is provided with an outward facing, forward-facing or front or outer surface 120 that faces forward or away from the user when the glasses 100 are mounted on the face of the user, and an opposite inward-facing, rearward-facing or rear or inner surface 108 that faces the face of the user when the glasses 100 are mounted on the face of the user. Such sensors can include inwardly-facing video sensors or digital imaging modules such as cameras that can be mounted on or provided within the inner surface 108 of the front piece 138 or elsewhere on the frame 112 so as to be facing the user, and outwardly-facing video sensors or digital imaging modules such as the cameras 102 that can be mounted on or provided with the outer surface 120 of the front piece 138 or elsewhere on the frame 112 so as to be facing away from the user. Such sensors, peripheral devices or peripherals can additionally include biometric sensors, location sensors, or any other such sensors. In one or more implementations, the glasses 100 include a track pad 140 or other touch or sensory input device to receive navigational commands from the user. One or more track pads 140 may be provided at convenient locations for user interaction on one or both of the track pad 140 and the temple piece 106.

With reference to FIG. 1, some examples herein provide a user the ability to cast or mirror their mobile computing device screen (e.g., smart phone, or client device 228 screen) to a wearable device (e.g., the glasses 100 described above) so that the user can view mirrored smart phone content, and/or augmented reality content, and/or a blend of mirrored smart phone content and augmented reality content in a glasses lens, for example. In some examples, a user can resize or rotate the mirrored screen viewable in the glasses 100 using hand gestures. In some examples, the user can navigate through the content and manipulate screens or windows viewable in the mirrored screen using hand gestures. Some examples allow a user to invoke mirroring by selecting a button or icon in a smart phone application (e.g., a glasses or messaging service app) running on the mobile computing device. Some examples enable cancelation of mirroring at both ends, i.e., at the mobile computing device (e.g., smart phone) and at the wearable device (e.g., glasses 100). Some examples enable the sharing of audio to the wearable device. Further details and aspects of mirroring are described further below.

Figure 2:
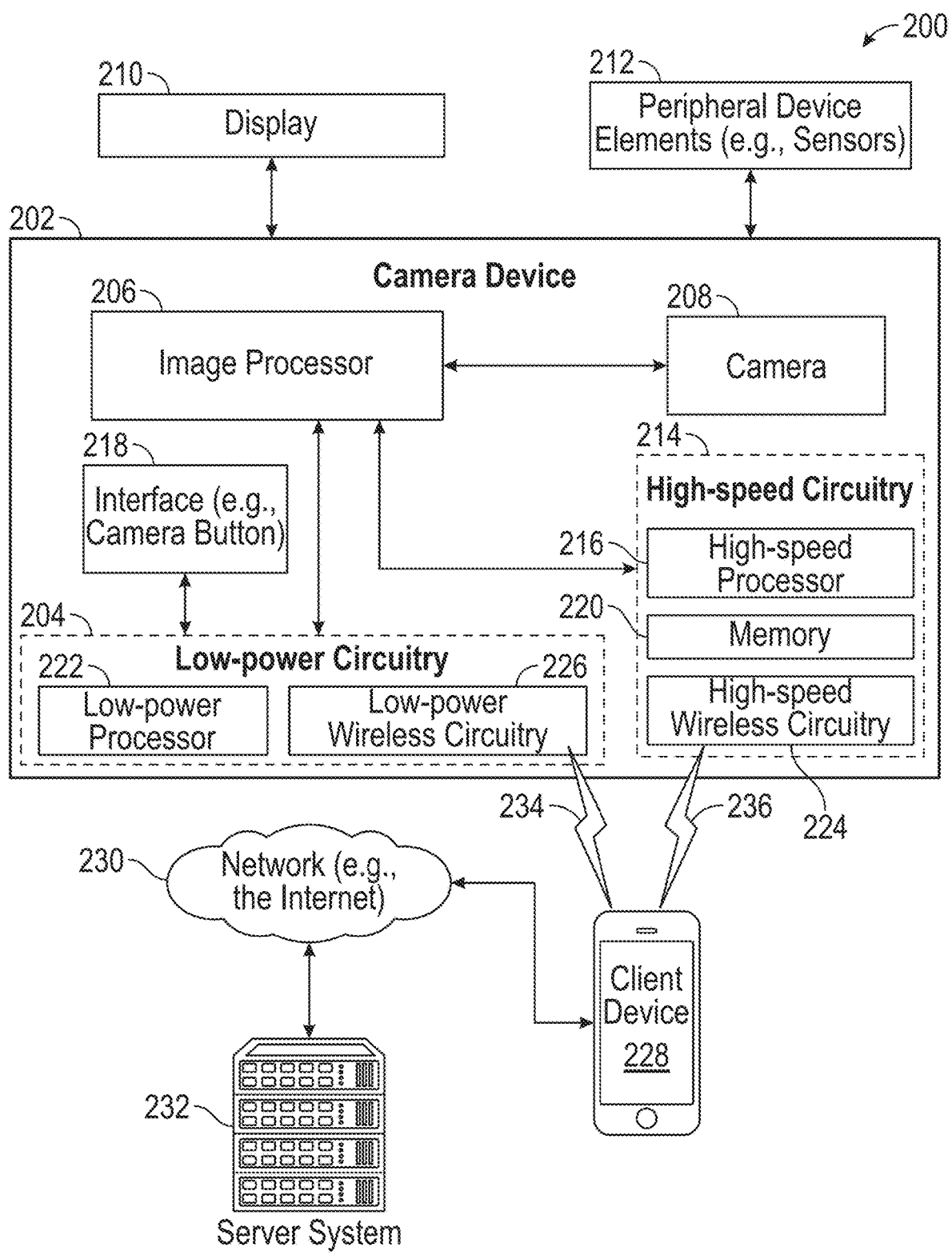
FIG. 2 is a block diagram illustrating a networked system including details of a camera device, in accordance with some example embodiments.

FIG. 2 is a block diagram illustrating a networked system 200 including details of a camera device 202, in accordance with some example embodiments. For example, the camera device 202 is implemented in the glasses 100 of FIG. 1 described above.

The networked system 200 includes the camera device 202, a client device 228, and a server system 232. The client device 228 may be a smartphone, tablet, phablet, laptop computer, access point, or any other such device capable of connecting with the camera device 202 using both a low-power wireless connection 234 and a high-speed wireless connection 236. The client device 228 is connected to the server system 232 and the network 230. The network 230 may include any combination of wired and wireless connections. The server system 232 may be one or more computing devices as part of a service or network computing system. The client device 228 and any elements of the server system 232 and network 230 may be implemented using details of the machine 1500 or the software architecture 1604 described in FIG. 15 and FIG. 16.

The networked system 200 may optionally include additional peripheral device elements 212 and/or a display 210 integrated with the camera device 202. The peripheral device elements 212 may include biometric sensors, additional sensors, or display elements integrated with the camera device 202. Examples of the peripheral device elements 212 are discussed further with respect to FIG. 15 and FIG. 16. For example, the peripheral device elements 212 may include any I/O components including output components, motion components, or any other such elements described herein. Example embodiments of the display 210 are discussed below.

The camera device 202 includes a camera 208, an image processor 206 (e.g., a video processor) an interface 218 (e.g. a camera button, or the track pad 140), low-power circuitry 204, and high-speed circuitry 214. The camera 208 includes digital camera elements such as a charge coupled device, a lens, or any other light capturing elements that may be used to capture data as part of the camera 208. In some examples, the camera 208 may be one or more of the cameras 102, discussed above with respect to FIG. 1.

The interface 218 refers to any source of a user command that is provided to the camera device 202. In one or more embodiments, the interface 218 is a physical button on a camera or the track pad 140 that, when depressed or touched, sends a user input signal from the interface 218 to a low-power processor 222. A depression of such a camera button (or track pad 140 touch) followed by an immediate release may be processed by the low-power processor 222 as a request to capture a single image. A depression of such a camera button for a first period of time may be processed by the low-power processor 222 as a request to capture video data while the button is depressed, and to cease video capture when the button is released, with the video captured while the button was depressed stored as a single video file. In one or more embodiments, the low-power processor 222 may have a threshold time period between the press of a button and a release, such as 500 milliseconds or one second, below which the button press and release is processed as an image request, and above which the button press and release is interpreted as a video request. The low-power processor 222 may make this determination while the image processor 206 (e.g., video processor) is booting. In other embodiments, the interface 218 may be any mechanical switch or physical interface capable of accepting user inputs associated with a request for data from the camera 208. In other embodiments, the interface 218 may have a software component, or may be associated with a command received wirelessly from another source.

The image processor 206 includes circuitry to receive signals from the camera 208 and process those signals from the camera 208 into a format suitable for storage in the memory 220. The image processor 206 is structured within the camera device 202 such that it may be powered on and booted under the control of the low-power circuitry 204. The image processor 206 may additionally be powered down by the low-power circuitry 204. Depending on various power design elements associated with the image processor 206, the image processor 206 may still consume a small amount of power even when it is in an off state. This power will, however, be negligible compared to the power used by the image processor 206 when it is in an on state, and will also have a negligible impact on battery life. As described herein, device elements in an "off" state are still configured within a device such that low-power processor 222 is able to power on and power down the devices. A device that is referred to as "off" or "powered down" during operation of the camera device 202 does not necessarily consume zero power due to leakage or other aspects of a system design.

In one or more embodiments, the image processor 206 (e.g., video processor) comprises a microprocessor integrated circuit (IC) customized for processing sensor data from the camera 208, along with volatile memory used by the microprocessor to operate. In order to reduce the amount of time that the image processor 206 takes when powering on to processing data, a non-volatile read only memory (ROM) may be integrated on the IC with instructions for operating or booting the image processor 206. This ROM may be minimized to match a minimum size needed to provide basic functionality for gathering sensor data from the camera 208, such that no extra functionality that would cause delays in boot time are present. The ROM may be configured with direct memory access (DMA) to the volatile memory of the microprocessor of the image processor 206. DMA allows memory-to-memory transfer of data from the ROM to system memory of the image processor 206 independently of operation of a main controller of the image processor 206. Providing DMA to this boot ROM further reduces the amount of time from power-on of the image processor 206 until sensor data from the camera 208 can be processed and stored. In certain embodiments, minimal processing of the camera signal from the camera 208 is performed by the image processor 206, and additional processing may be performed by applications operating on the client device 228 or the server system 232.

The low-power circuitry 204 includes the low-power processor 222 and the low-power wireless circuitry 226. These elements of the low-power circuitry 204 may be implemented as separate elements or may be implemented on a single IC as part of a system on a single chip. The low-power processor 222 includes logic for managing the other elements of the camera device 202. As described above, for example, the low-power processor 222 may accept user input signals from the interface 218. The low-power processor 222 may also be configured to receive input signals or instruction communications from the client device 228 via the low-power wireless connection 234. The low-power wireless circuitry 226 includes circuit elements for implementing a low-power wireless communication system. BLUETOOTH® Smart, also known as BLUETOOTH® low energy, is one standard implementation of a low power wireless communication system that may be used to implement the low-power wireless circuitry 226. In other embodiments, other low power communication systems may be used.

The high-speed circuitry 214 includes a high-speed processor 216, a memory 220, and a high-speed wireless circuitry 224. The high-speed processor 216 may be any processor capable of managing high-speed communications and operation of any general computing system needed for the camera device 202. The high-speed processor 216 includes processing resources needed for managing high-speed data transfers on the high-speed wireless connection 236 using the high-speed wireless circuitry 224. In certain embodiments, the high-speed processor 216 executes an operating system such as a LINUX operating system or other such operating system such as the operating system 1612 of FIG. 16. In addition to any other responsibilities, the high-speed processor 216 executing a software architecture for the camera device 202 is used to manage data transfers with the high-speed wireless circuitry 224. In certain embodiments, the high-speed wireless circuitry 224 is configured to implement Institute of Electrical and Electronic Engineers (IEEE) 802.11 communication standards, also referred to herein as Wi-Fi. In other embodiments, other high-speed communications standards may be implemented by the high-speed wireless circuitry 224.

The memory 220 includes any storage device capable of storing camera data generated by the camera 208 and the image processor 206. While the memory 220 is shown as integrated with the high-speed circuitry 214, in other embodiments, the memory 220 may be an independent standalone element of the camera device 202. In certain such embodiments, electrical routing lines may provide a connection through a chip that includes the high-speed processor 216 from image processor 206 or the low-power processor 222 to the memory 220. In other embodiments, the high-speed processor 216 may manage addressing of the memory 220 such that the low-power processor 222 will boot the high-speed processor 216 any time that a read or write operation involving the memory 220 is needed.

Networked Computing Environment

Figure 3:
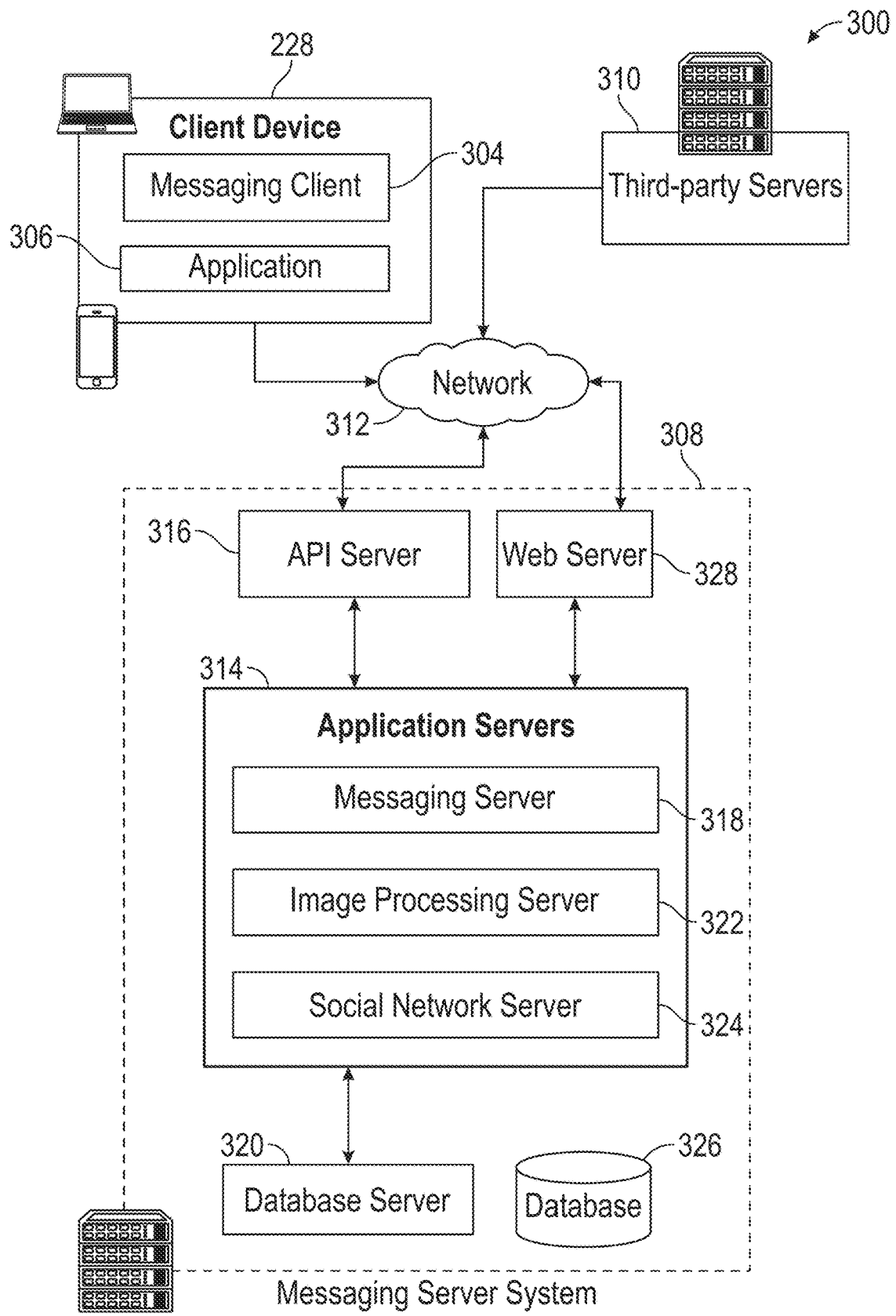
FIG. 3 is a diagrammatic representation of a networked environment in which the present disclosure may be deployed, in accordance with some examples.

FIG. 3 is a block diagram showing an example messaging system 300 for exchanging data (e.g., messages and associated content) over a network. The messaging system 300 includes multiple instances of a client device 228, each of which hosts a number of applications, including a messaging client 304 and other applications 306. Each messaging client 304 is communicatively coupled to other instances of the messaging client 304 (e.g., hosted on respective other client devices 228), a messaging server system 308 and third-party servers 310 via a network 312 (e.g., the Internet). A messaging client 304 can also communicate with locally-hosted applications 306 using Applications Program Interfaces (APIs).

A messaging client 304 is able to communicate and exchange data with other messaging clients 304 and with the messaging server system 308 via the network 312. The data exchanged between messaging clients 304, and between a messaging client 304 and the messaging server system 308, includes functions (e.g., commands to invoke functions) as well as payload data (e.g., text, audio, video or other multimedia data).

The messaging server system 308 provides server-side functionality via the network 312 to a particular messaging client 304. While certain functions of the messaging system 300 are described herein as being performed by either a messaging client 304 or by the messaging server system 308, the location of certain functionality either within the messaging client 304 or the messaging server system 308 may be a design choice. For example, it may be technically preferable to initially deploy certain technology and functionality within the messaging server system 308 but to later migrate this technology and functionality to the messaging client 304 where a client device 228 has sufficient processing capacity.

The messaging server system 308 supports various services and operations that are provided to the messaging client 304. Such operations include transmitting data to, receiving data from, and processing data generated by the messaging client 304. This data may include message content, client device information, geolocation information, media augmentation and overlays, message content persistence conditions, social network information, and live event information, as examples. Data exchanges within the messaging system 300 are invoked and controlled through functions available via user interfaces (UIs) of the messaging client 304.

Turning now specifically to the messaging server system 308, an Application Program Interface (API) server 316 is coupled to, and provides a programmatic interface to, application servers 314. The application servers 314 are communicatively coupled to a database server 320, which facilitates access to a database 326 that stores data associated with messages processed by the application servers 314. Similarly, a web server 328 is coupled to the application servers 314, and provides web-based interfaces to the application servers 314. To this end, the web server 328 processes incoming network requests over the Hypertext Transfer Protocol (HTTP) and several other related protocols.

The Application Program Interface (API) server 316 receives and transmits message data (e.g., commands and message payloads) between the client device 228 and the application servers 314. Specifically, the Application Program Interface (API) server 316 provides a set of interfaces (e.g., routines and protocols) that can be called or queried by the messaging client 304 in order to invoke functionality of the application servers 314. The Application Program Interface (API) server 316 exposes various functions supported by the application servers 314, including account registration, login functionality, the sending of messages, via the application servers 314, from a particular messaging client 304 to another messaging client 304, the sending of media files (e.g., images or video) from a messaging client 304 to a messaging server 318, and for possible access by another messaging client 304, the settings of a collection of media data (e.g., story), the retrieval of a list of friends of a user of a client device 228, the retrieval of such collections, the retrieval of messages and content, the addition and deletion of entities (e.g., friends) to an entity graph (e.g., a social graph), the location of friends within a social graph, and opening an application event (e.g., relating to the messaging client 304).

The application servers 314 host a number of server applications and subsystems, including for example a messaging server 318, an image processing server 322, and a social network server 324. The messaging server 318 implements a number of message processing technologies and functions, particularly related to the aggregation and other processing of content (e.g., textual and multimedia content) included in messages received from multiple instances of the messaging client 304. As will be described in further detail, the text and media content from multiple sources may be aggregated into collections of content (e.g., called stories or galleries). These collections are then made available to the messaging client 304. Other processor and memory intensive processing of data may also be performed server-side by the messaging server 318, in view of the hardware requirements for such processing.

The application servers 314 also include an image processing server 322 that is dedicated to performing various image processing operations, typically with respect to images or video within the payload of a message sent from or received at the messaging server 318.

Figure 5:
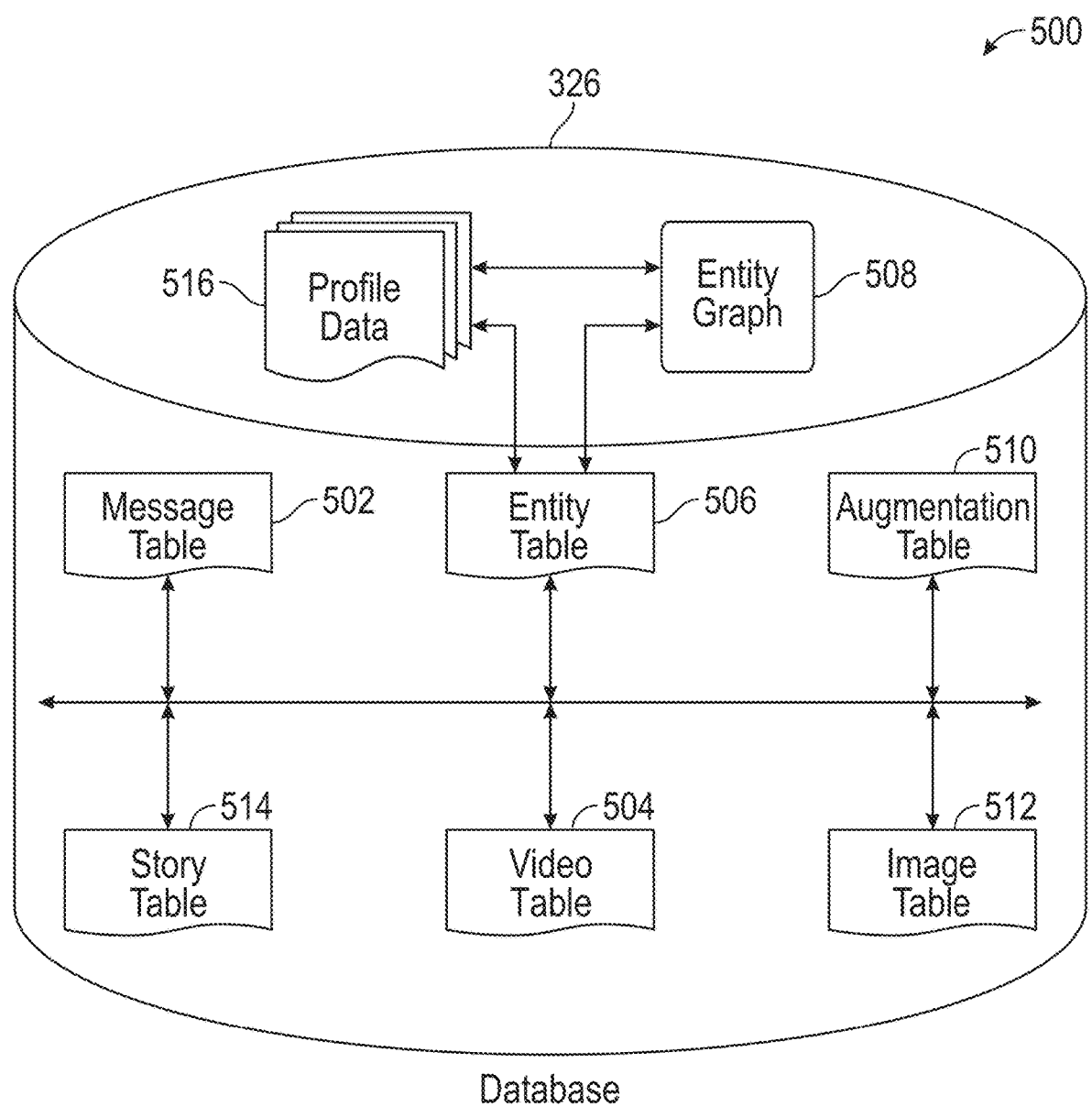
FIG. 5 is a diagrammatic representation of a data structure as maintained in a database, in accordance with some examples.

The social network server 324 supports various social networking functions and services and makes these functions and services available to the messaging server 318. To this end, the social network server 324 maintains and accesses an entity graph 508 (as shown in FIG. 5) within the database 326. Examples of functions and services supported by the social network server 324 include the identification of other users of the messaging system 300 with which a particular user has relationships or is "following," and also the identification of other entities and interests of a particular user.

Returning to the messaging client 304, features and functions of an external resource (e.g., an application 306 or applet) are made available to a user via an interface of the messaging client 304. In this context, "external" refers to the fact that the application 306 or applet is external to the messaging client 304. The external resource is often provided by a third party but may also be provided by the creator or provider of the messaging client 304. The messaging client 304 receives a user selection of an option to launch or access features of such an external resource. The external resource may be the application 306 installed on the client device 228 (e.g., a "native app"), or a small-scale version of the application (e.g., an "applet") that is hosted on the client device 228 or remote of the client device 228 (e.g., on third-party servers 310). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 304. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 304 determines whether the selected external resource is a web-based external resource or a locally-executed or locally hosted application 306. In some cases, applications 306 that are locally installed on the client device 228 can be launched independently of and separately from the messaging client 304, such as by selecting an icon, corresponding to the application 306, on a home screen of the client device 228. Small-scale versions of such applications can be launched or accessed via the messaging client 304 and, in some examples, no or limited portions of the small-scale application can be accessed outside of the messaging client 304. The small-scale application can be launched by the messaging client 304 receiving, from a third-party server 310 for example, a markup-language document associated with the small-scale application and processing such a document.

In response to determining that the external resource is a locally-executed or locally hosted application 306, the messaging client 304 instructs the client device 228 to launch the external resource by executing locally-stored code corresponding to the external resource. In response to determining that the external resource is a web-based resource, the messaging client 304 communicates with the third-party servers 310 (for example) to obtain a markup-language document corresponding to the selected external resource. The messaging client 304 then processes the obtained markup-language document to present the web-based external resource within a user interface of the messaging client 304.

The messaging client 304 can notify a user of the client device 228, or other users related to such a user (e.g., "friends"), of activity taking place in one or more external resources. For example, the messaging client 304 can provide participants in a conversation (e.g., a chat session) in the messaging client 304 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 304, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 304. The external resource can selectively include different media items in the responses, based on a current context of the external resource.

The messaging client 304 can present a list of the available external resources (e.g., applications 306 or applets) to a user to launch or access a given external resource. This list can be presented in a context-sensitive menu. For example, the icons representing different ones of the application 306 (or applets) can vary based on how the menu is launched by the user (e.g., from a conversation interface or from a non-conversation interface).

System Architecture

Figure 4:
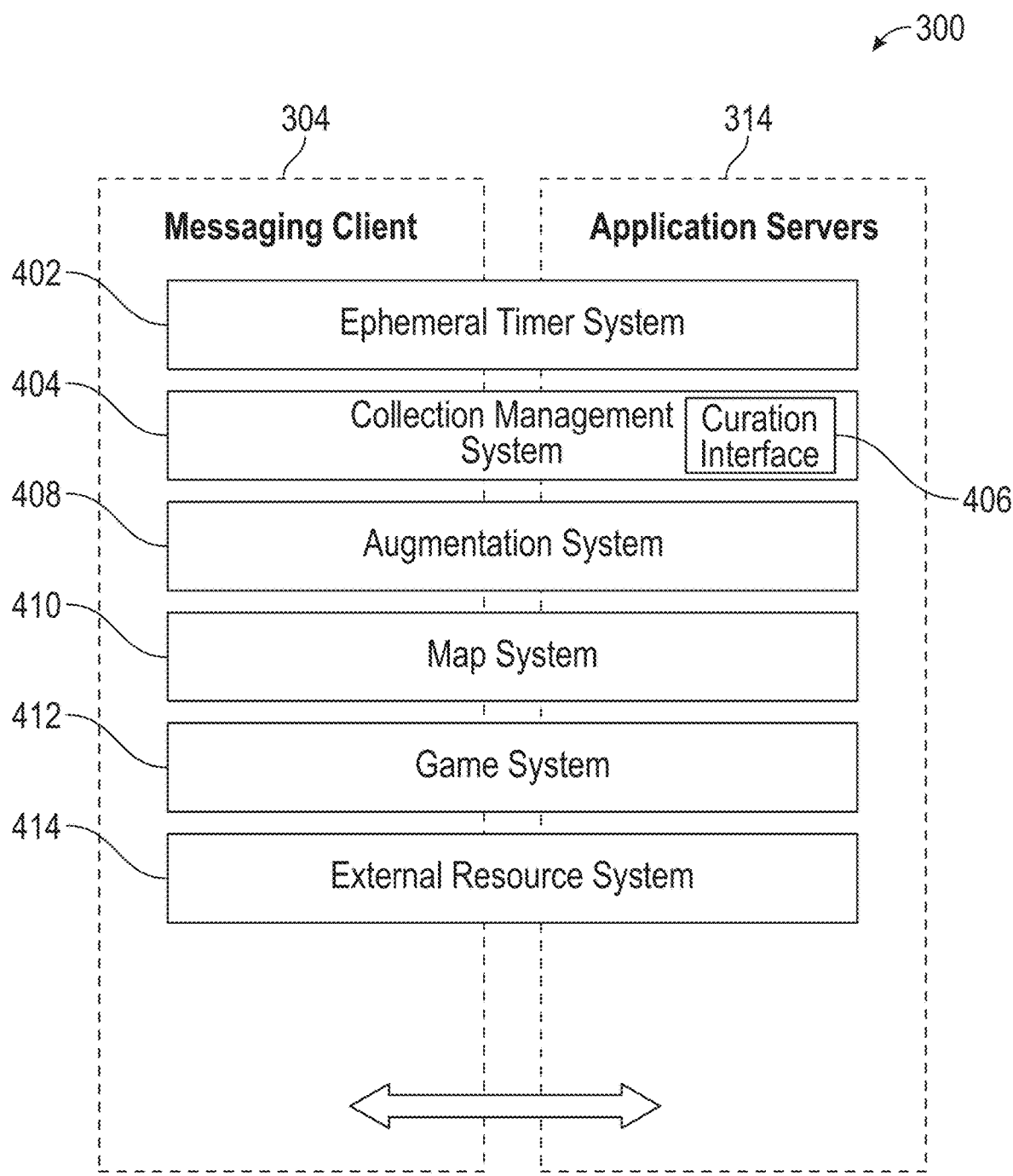
FIG. 4 is a diagrammatic representation of a messaging system, in accordance with some examples, that has both client-side and server-side functionality.

FIG. 4 is a block diagram illustrating further details regarding the messaging system 300, according to some examples. Specifically, the messaging system 300 is shown to comprise the messaging client 304 and the application servers 314. The messaging system 300 embodies a number of subsystems, which are supported on the client-side by the messaging client 304 and on the sever-side by the application servers 314. These subsystems include, for example, an ephemeral timer system 402, a collection management system 404, an augmentation system 408, a map system 410, a game system 412, and an external resource system 414.

The ephemeral timer system 402 is responsible for enforcing the temporary or time-limited access to content by the messaging client 304 and the messaging server 318. The ephemeral timer system 402 incorporates a number of timers that, based on duration and display parameters associated with a message, or collection of messages (e.g., a story), selectively enable access (e.g., for presentation and display) to messages and associated content via the messaging client 304. Further details regarding the operation of the ephemeral timer system 402 are provided below.

The collection management system 404 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 404 may also be responsible for publishing an icon that provides notification of the existence of a particular collection to the user interface of the messaging client 304.

The collection management system 404 furthermore includes a curation interface 406 that allows a collection manager to manage and curate a particular collection of content. For example, the curation interface 406 enables an event organizer to curate a collection of content relating to a specific event (e.g., delete inappropriate content or redundant messages). Additionally, the collection management system 404 employs machine vision (or image recognition technology) and content rules to automatically curate a content collection. In certain examples, compensation may be paid to a user for the inclusion of user-generated content into a collection. In such cases, the collection management system 404 operates to automatically make payments to such users for the use of their content.

The augmentation system 408 provides various functions that enable a user to augment (e.g., annotate or otherwise modify or edit) media content associated with a message. For example, the augmentation system 408 provides functions related to the generation and publishing of media overlays for messages processed by the messaging system 300. The augmentation system 408 operatively supplies a media overlay or augmentation (e.g., an image filter) to the messaging client 304 based on a geolocation of the client device 228. In another example, the augmentation system 408 operatively supplies a media overlay to the messaging client 304 based on other information, such as social network information of the user of the client device 228. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 228. For example, the media overlay may include text or image that can be overlaid on top of a photograph taken by the client device 228. In another example, the media overlay includes an identification of a location overlay (e.g., Venice beach), a name of a live event, or a name of a merchant overlay (e.g., Beach Coffee House). In another example, the augmentation system 408 uses the geolocation of the client device 228 to identify a media overlay that includes the name of a merchant at the geolocation of the client device 228. The media overlay may include other indicia associated with the merchant. The media overlays may be stored in the database 326 and accessed through the database server 320.

In some examples, the augmentation system 408 provides a user-based publication platform that enables users to select a geolocation on a map and upload content associated with the selected geolocation. The user may also specify circumstances under which a particular media overlay should be offered to other users. The augmentation system 408 generates a media overlay that includes the uploaded content and associates the uploaded content with the selected geolocation.

In other examples, the augmentation system 408 provides a merchant-based publication platform that enables merchants to select a particular media overlay associated with a geolocation via a bidding process. For example, the augmentation system 408 associates the media overlay of the highest bidding merchant with a corresponding geolocation for a predefined amount of time.

The map system 410 provides various geographic location functions, and supports the presentation of map-based media content and messages by the messaging client 304. For example, the map system 410 enables the display of user icons or avatars (e.g., stored in profile data 516) on a map to indicate a current or past location of "friends" of a user, as well as media content (e.g., collections of messages including photographs and videos) generated by such friends, within the context of a map. For example, a message posted by a user to the messaging system 300 from a specific geographic location may be displayed within the context of a map at that particular location to "friends" of a specific user on a map interface of the messaging client 304. A user can furthermore share his or her location and status information (e.g., using an appropriate status avatar) with other users of the messaging system 300 via the messaging client 304, with this location and status information being similarly displayed within the context of a map interface of the messaging client 304 to selected users.

The game system 412 provides various gaming functions within the context of the messaging client 304. The messaging client 304 provides a game interface providing a list of available games that can be launched by a user within the context of the messaging client 304, and played with other users of the messaging system 300. The messaging system 300 further enables a particular user to invite other users to participate in the play of a specific game, by issuing invitations to such other users from the messaging client 304. The messaging client 304 also supports both the voice and text messaging (e.g., chats) within the context of gameplay, provides a leaderboard for the games, and also supports the provision of in-game rewards (e.g., coins and items).

The external resource system 414 provides an interface for the messaging client 304 to communicate with remote servers (e.g., third-party servers 310) to launch or access external resources, i.e., applications or applets. Each third-party server 310 hosts, for example, a markup language (e.g., HTML5) based application or small-scale version of an application (e.g., game, utility, payment, or ride-sharing application). The messaging client 304 may launches a web-based resource (e.g., application) by accessing the HTML5 file from the third-party servers 310 associated with the web-based resource. In certain examples, applications hosted by third-party servers 310 are programmed in JavaScript leveraging a Software Development Kit (SDK) provided by the messaging server 318. The SDK includes Application Programming Interfaces (APIs) with functions that can be called or invoked by the web-based application. In certain examples, the messaging server 318 includes a JavaScript library that provides a given external resource access to certain user data of the messaging client 304. HTML5 is used as an example technology for programming games, but applications and resources programmed based on other technologies can be used.

In order to integrate the functions of the SDK into the web-based resource, the SDK is downloaded by a third-party server 310 from the messaging server 318 or is otherwise received by the third-party server 310. Once downloaded or received, the SDK is included as part of the application code of a web-based external resource. The code of the web-based resource can then call or invoke certain functions of the SDK to integrate features of the messaging client 304 into the web-based resource.

The SDK stored on the messaging server 318 effectively provides the bridge between an external resource (e.g., applications 306 or applets and the messaging client 304. This provides the user with a seamless experience of communicating with other users on the messaging client 304, while also preserving the look and feel of the messaging client 304. To bridge communications between an external resource and a messaging client 304, in certain examples, the SDK facilitates communication between third-party servers 310 and the messaging client 304. In certain examples, a WebViewJavaScriptBridge running on a client device 228 establishes two one-way communication channels between an external resource and the messaging client 304. Messages are sent between the external resource and the messaging client 304 via these communication channels asynchronously. Each SDK function invocation is sent as a message and callback. Each SDK function is implemented by constructing a unique callback identifier and sending a message with that callback identifier.

By using the SDK, not all information from the messaging client 304 is shared with third-party servers 310. The SDK limits which information is shared based on the needs of the external resource. In certain examples, each third-party server 310 provides an HTML5 file corresponding to the web-based external resource to the messaging server 318. The messaging server 318 can add a visual representation (such as a box art or other graphic) of the web-based external resource in the messaging client 304. Once the user selects the visual representation or instructs the messaging client 304 through a GUI of the messaging client 304 to access features of the web-based external resource, the messaging client 304 obtains the HTML5 file and instantiates the resources necessary to access the features of the web-based external resource.

The messaging client 304 presents a graphical user interface (e.g., a landing page or title screen) for an external resource. During, before, or after presenting the landing page or title screen, the messaging client 304 determines whether the launched external resource has been previously authorized to access user data of the messaging client 304. In response to determining that the launched external resource has been previously authorized to access user data of the messaging client 304, the messaging client 304 presents another graphical user interface of the external resource that includes functions and features of the external resource. In response to determining that the launched external resource has not been previously authorized to access user data of the messaging client 304, after a threshold period of time (e.g., 3 seconds) of displaying the landing page or title screen of the external resource, the messaging client 304 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 304 adds the external resource to a list of authorized external resources and allows the external resource to access user data from the messaging client 304. In some examples, the external resource is authorized by the messaging client 304 to access the user data in accordance with an OAuth 2 framework.

The messaging client 304 controls the type of user data that is shared with external resources based on the type of external resource being authorized. For example, external resources that include full-scale applications (e.g., an application 306) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 5 is a schematic diagram illustrating data structures 500, which may be stored in the database 326 of the messaging server system 308, according to certain examples. While the content of the database 326 is shown to comprise a number of tables, it will be appreciated that the data could be stored in other types of data structures (e.g., as an object-oriented database).

The database 326 includes message data stored within a message table 502. This message data includes, for any particular one message, at least message sender data, message recipient (or receiver) data, and a payload. Further details regarding information that may be included in a message, and included within the message data stored in the message table 502 is described below with reference to FIG. 6.

An entity table 506 stores entity data, and is linked (e.g., referentially) to an entity graph 508 and profile data 516. Entities for which records are maintained within the entity table 506 may include individuals, corporate entities, organizations, objects, places, events, and so forth. Regardless of entity type, any entity regarding which the messaging server system 308 stores data may be a recognized entity. Each entity is provided with a unique identifier, as well as an entity type identifier (not shown).

The entity graph 508 stores information regarding relationships and associations between entities. Such relationships may be social, professional (e.g., work at a common corporation or organization) interested-based or activity-based, merely for example.

The profile data 516 stores multiple types of profile data about a particular entity. The profile data 516 may be selectively used and presented to other users of the messaging system 300, based on privacy settings specified by a particular entity. Where the entity is an individual, the profile data 516 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 300, and on map interfaces displayed by messaging clients 304 to other users. The collection of avatar representations may include "status avatars," which present a graphical representation of a status or activity that the user may select to communicate at a particular time.

Where the entity is a group, the profile data 516 for the group may similarly include one or more avatar representations associated with the group, in addition to the group name, members, and various settings (e.g., notifications) for the relevant group.

The database 326 also stores augmentation data, such as overlays or filters, in an augmentation table 510. The augmentation data is associated with and applied to videos (for which data is stored in a video table 504) and images (for which data is stored in an image table 512).

Filters, in one example, are overlays that are displayed as overlaid on an image or video during presentation to a recipient user. Filters may be of various types, including user-selected filters from a set of filters presented to a sending user by the messaging client 304 when the sending user is composing a message. Other types of filters include geolocation filters (also known as geo-filters), which may be presented to a sending user based on geographic location. For example, geolocation filters specific to a neighborhood or special location may be presented within a user interface by the messaging client 304, based on geolocation information determined by a Global Positioning System (GPS) unit of the client device 228.

Another type of filter is a data filter, which may be selectively presented to a sending user by the messaging client 304, based on other inputs or information gathered by the client device 228 during the message creation process. Examples of data filters include current temperature at a specific location, a current speed at which a sending user is traveling, battery life for a client device 228, or the current time.

Other augmentation data that may be stored within the image table 512 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 228 and then displayed on a screen of the client device 228 with the modifications. This also includes modifications to stored content, such as video clips in a gallery that may be modified. For example, in a client device 228 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 228 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 228) and perform complex image manipulations locally on the client device 228 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 228.

In some examples, a computer animation model to transform image data can be used by a system where a user may capture an image or video stream of the user (e.g., a selfie) using a client device 228 having a neural network operating as part of a messaging client 304 operating on the client device 228. The transformation system operating within the messaging client 304 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 228 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 514 stores data regarding collections of messages and associated image, video, or audio data, which are compiled into a collection (e.g., a story or a gallery). The creation of a particular collection may be initiated by a particular user (e.g., each user for which a record is maintained in the entity table 506). A user may create a "personal story" in the form of a collection of content that has been created and sent/broadcast by that user. To this end, the user interface of the messaging client 304 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 304, to contribute content to a particular live story. The live story may be identified to the user by the messaging client 304, based on his or her location. The end result is a "live story" told from a community perspective.

A further type of content collection is known as a "location story," which enables a user operating a client device 228 located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 504 stores video data that, in one example, is associated with messages for which records are maintained within the message table 502. Similarly, the image table 512 stores image data associated with messages for which message data is stored in the entity table 506. The entity table 506 may associate various augmentations from the augmentation table 510 with various images and videos stored in the image table 512 and the video table 504.

Data Communications Architecture

Figure 6:
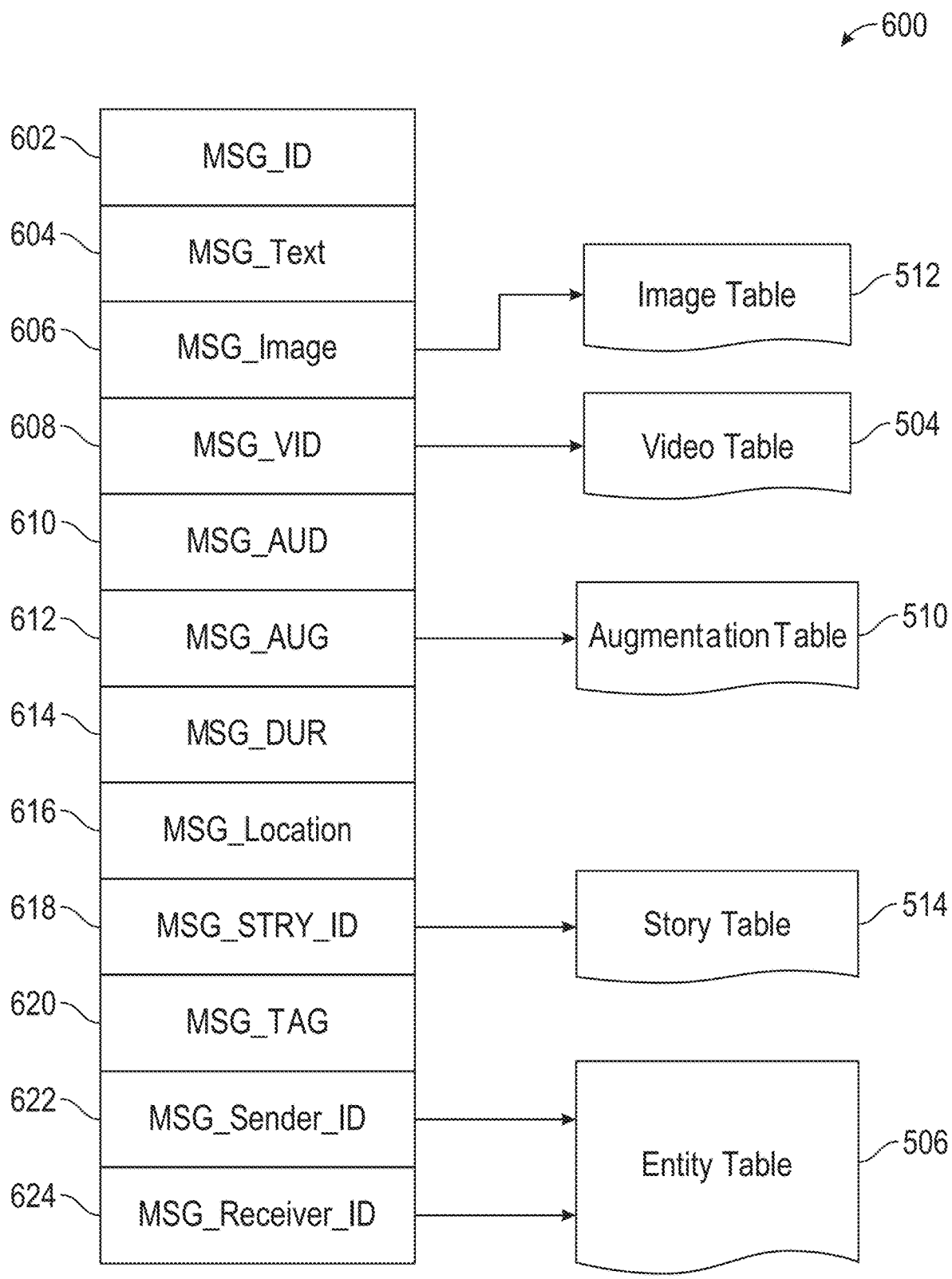
FIG. 6 is a diagrammatic representation of a message, in accordance with some examples.

FIG. 6 is a schematic diagram illustrating a structure of a message 600, according to some examples, generated by a messaging client 304 for communication to a further messaging client 304 or the messaging server 318. The content of a particular message 600 is used to populate the message table 502 stored within the database 326, accessible by the messaging server 318. Similarly, the content of a message 600 is stored in memory as "in-transit" or "in-flight" data of the client device 228 or the application servers 314. A message 600 is shown to include the following example components:

message identifier 602: a unique identifier that identifies the message 600.
 message text payload 604: text, to be generated by a user via a user interface of the client device 228, and that is included in the message 600.
 message image payload 606: image data, captured by a camera component of a client device 228 or retrieved from a memory component of a client device 228, and that is included in the message 600. Image data for a sent or received message 600 may be stored in the image table 512.
 message video payload 608: video data, captured by a camera component or retrieved from a memory component of the client device 228, and that is included in the message 600. Video data for a sent or received message 600 may be stored in the video table 504.
 message audio payload 610: audio data, captured by a microphone or retrieved from a memory component of the client device 228, and that is included in the message 600.

message augmentation data 612: augmentation data (e.g., filters, stickers, or other annotations or enhancements) that represents augmentations to be applied to message image payload 606, message video payload 608, or message audio payload 610 of the message 600. Augmentation data for a sent or received message 600 may be stored in the augmentation table 510.

message duration parameter 614: parameter value indicating, in seconds, the amount of time for which content of the message (e.g., the message image payload 606, message video payload 608, message audio payload 610) is to be presented or made accessible to a user via the messaging client 304.

message geolocation parameter 616: geolocation data (e.g., latitudinal and longitudinal coordinates) associated with the content payload of the message. Multiple message geolocation parameter 616 values may be included in the payload, each of these parameter values being associated with respect to content items included in the content (e.g., a specific image into within the message image payload 606, or a specific video in the message video payload 608).

message story identifier 618: identifier values identifying one or more content collections (e.g., "stories" identified in the story table 514) with which a particular content item in the message image payload 606 of the message 600 is associated. For example, multiple images within the message image payload 606 may each be associated with multiple content collections using identifier values.

message tag 620: each message 600 may be tagged with multiple tags, each of which is indicative of the subject matter of content included in the message payload. For example, where a particular image included in the message image payload 606 depicts an animal (e.g., a lion), a tag value may be included within the message tag 620 that is indicative of the relevant animal. Tag values may be generated manually, based on user input, or may be automatically generated using, for example, image recognition.

message sender identifier 622: an identifier (e.g., a messaging system identifier, email address, or device identifier) indicative of a user of the Client device 228 on which the message 600 was generated and from which the message 600 was sent.

message receiver identifier 624: an identifier (e.g., a messaging system identifier, email address, or device identifier) indicative of a user of the client device 228 to which the message 600 is addressed.

The contents (e.g., values) of the various components of message 600 may be pointers to locations in tables within which content data values are stored. For example, an image value in the message image payload 606 may be a pointer to (or address of) a location within an image table 512. Similarly, values within the message video payload 608 may point to data stored within a video table 504, values stored within the message augmentations 612 may point to data stored in an augmentation table 510, values stored within the message story identifier 618 may point to data stored in a story table 514, and values stored within the message sender identifier 622 and the message receiver identifier 624 may point to user records stored within an entity table 506.

Mirroring

At a high level, some examples enable a user to mirror a client device 228 (e.g., a smart phone running iOS) to a wearable device (e.g., glasses 100). For example, a user operating a messaging application can tap an icon "Mirror phone screen" displayed in the screen of the smart phone. A screen pops up on the glasses indicating "loading" and a screen mirroring process commences. At that point, in some examples, the entire phone screen, as well as any screens and/or pages the user views if the user leaves the messaging application to view screens presented by a video viewing application or visits pages of a web browser, are mirrored in real time in the glasses. Embodiments disclosed herein can operate on iOS and Android operating systems, for example. A wealth of content can be opened up for viewing on glasses, accordingly. In some examples, a mirrored screen in the wearable device has the same aspect ratio as the original screen in the client device, but in some examples the aspect ratio is changed such that a different aspect ratio of the mirrored screen is visible in the wearable device.

Some examples herein include a mirroring application extension. An example mirroring application extension employs a native library to join a socket connection for sharing media to be mirrored. Information about the socket, for example a local IP address, port, and encryption information, is shared with the mirroring application extension using, in some examples, an existing BLUETOOTH® (or other short-range wireless) connection in conjunction with a Remote Procedure Call (RPC) messaging system. In some examples, a short distance communication method is used to set up a Wi-Fi communication.

In some examples, one or more hardware processors executing on the glasses 100, more specifically in the computer 132 of the glasses 100, opens a socket and returns an RPC message with information about how to connect to it. In some examples, the socket is a web socket. In some examples, the web socket is visible only on a local network, for example a home Wi-Fi or proxy network. In some examples, the socket is a User Datagram Protocol (UDP) socket. IN some instances, a UDP socket can provide slightly different or enhanced connection flow and be better suited for low latency video streaming. In some examples, an opened socket (whether a web socket, a UDP socket, or other socket for example) is used during a mirroring Wi-Fi flow. In some examples, the socket is used to launch a mirroring lens in the wearable device to receive the Wi-Fi flow.

If the connection is successful, the computer 132 of the glasses 100 opens a mirroring lens on the glasses 100 which attempts to get video frames from a mirroring lens core component. The mirroring lens core component fetches video frames from an established Wi-Fi connection running in a real-time service and provides the video frames to the mirroring lens viewed by the user. Some examples employ a fetching delegate in this regard. Audio data is also streamed in some examples but is communicated for play on a connected speaker directly via the real-time service. If the connection is unsuccessful, an error message is shown on the client device 228 advising the user to check that the client device 228 and glasses 100 are connected to the same Wi-Fi network (if available), or connected via a proxy flow (as a fall back) described further below.

Thus, some examples utilize BLUETOOTH® (or other short-range wireless) connection merely to initiate a mirroring connection by opening a socket, but because BLUETOOTH® does not provide sufficient bandwidth to support video streaming, some examples herein subsequently employ a Wi-Fi or proxy network for video streaming through the connected socket. Examples can address some current drawbacks present in sharing applications such as Apple Airplay which does not expose public APIs for third-party use, and further address limitations present in iOS/Android cross-sharing (for example, Google cast receivers cannot be used for iOS devices). Examples herein also provide potential solutions not provided by other libraries that require a messaging user to "call themselves" to access library content.

Figure 7:
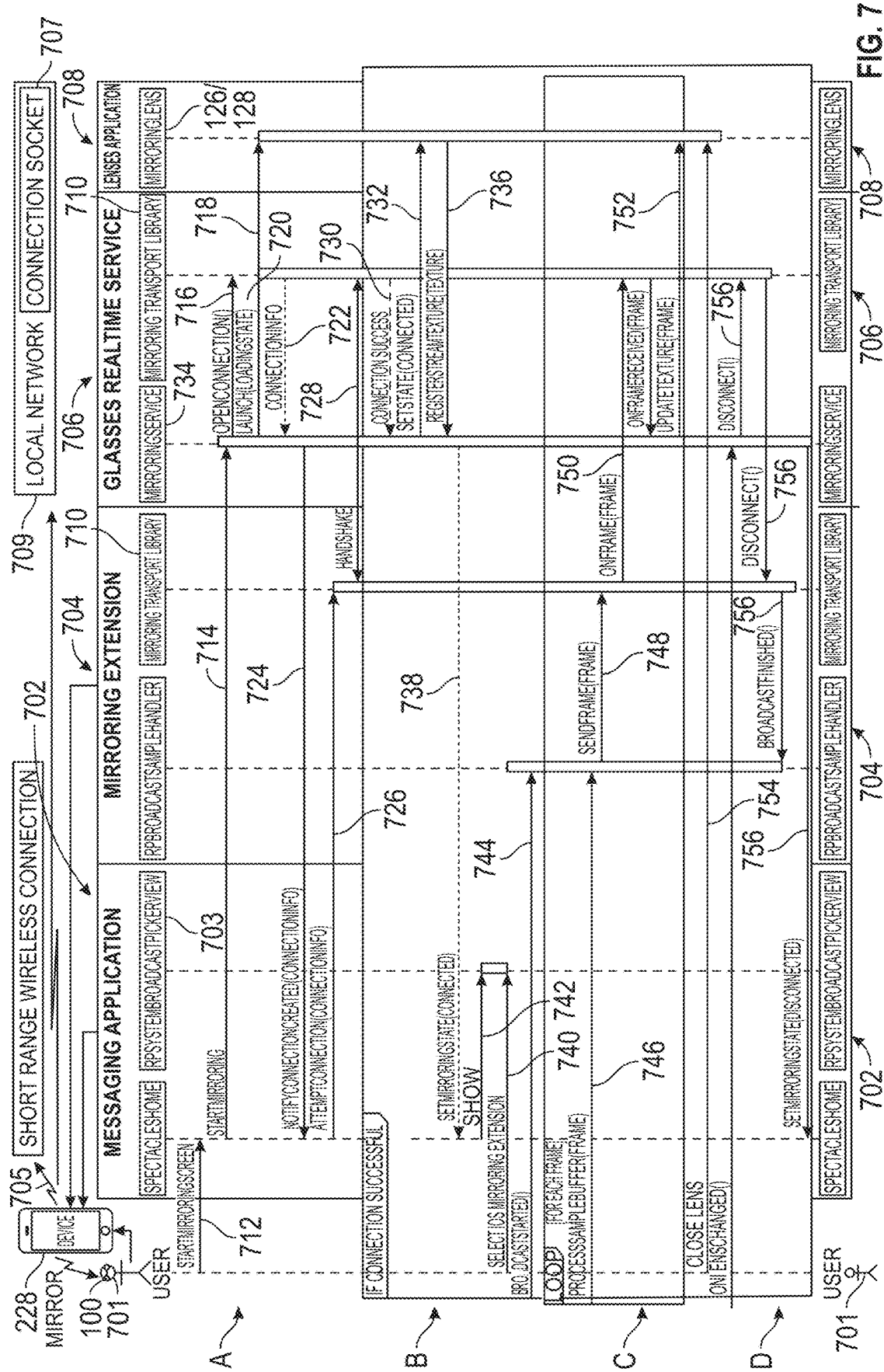
FIG. 7 depicts a sequence diagram of an example process for mirroring a screen of a client device, in accordance with some examples.

FIG. 7 depicts a sequence diagram of an example process for mirroring a screen of a client device (e.g., the client device 228, referred to for simplicity of explanation in the following example without limitation as a smart phone) in a wearable device (e.g., the glasses 100, referred to in the following example for simplicity of explanation in the following example without limitation as glasses) in accordance with some examples. In the view, the two leftmost columns represent respectively a messaging application 702 and a mirroring application extension, or simply a mirroring extension 704. In this example, the messaging application 702 and the mirroring extension 704 execute on the smart phone. The two rightmost columns represent a glasses real-time service 706 executing on the glasses (for example on the computer 132 of the glasses 100) and a lenses application 708 also executing on the glasses 100.

In some examples, two mirroring lenses are provided, one for each eye of the user, each mirroring lens being mounted on or located in association with a physical, actual, or "see through" lens of the glasses. In some examples, a mirroring lens core component operates the mirroring lens (or mirroring lenses) viewable in the glasses by the user 701. In some examples, a mirroring lens (or both mirroring lenses) includes the first or left optical element 126 and/or the second or right optical element 128 of FIG. 1. In some examples, a mirroring lens runtime library is (or includes) a native library used on the wearable device, or the client device (for example in conjunction with iOS or Android) to and render lenses on a display, for example when mirroring content. In a mirroring implementation, some examples include JavaScript which runs in the lens core component runtime. In some examples, all the user interfaces implementing or presented on the wearable device (glasses) employ the mirroring lens runtime library for display rendering and user interface logic. For rendering a mirrored display, some examples include a hardware graphics buffer into which frames from a mirroring connection can be rendered and then processed for display in the mirroring lens (or lenses).

As shown, some examples include a mirroring transport library 710 shared between the mirroring extension 704 and the real-time service 706. A technical advantage of the shared mirroring transport library is that it reduces code deduplication and allows examples to leverage existing media call logic from existing calling libraries.

In the example operations that follow, the exemplary smart phone and glasses are already connected to each other by a BLUETOOTH® connection (or other short-range wireless connection) 705 when within a certain proximity of each other. If not so connected, the user 701 moves the glasses into proximity with the smart phone to establish a BLUETOOTH® connection and launches the messaging application 702.

In row A of FIG. 7, the user 701 initiates the mirroring process by operating the smart phone to send, in operation 712, an instruction to the messaging application 702 to start mirroring the smart phone screen in the glasses. Examples enable the mirrored screen of the smart phone to be viewed in a mirroring lens of the glasses. As mentioned above, user commands may be sent, processed, and/or received using an RPC system 703. In operation 714, the messaging application 702 uses the existing or established BLUETOOTH® connection 705 to send a "start mirroring" message to the glasses real-time service 706. The "start mirroring" message instructs the glasses real-time service 706 to open a new connection socket 707 in a local network 709 to receive mirrored content from the smart phone 228. In response to receiving the instruction in the "start mirroring" message, in operation 716 the glasses real-time service 706 opens a connection. The opened connection at connection socket 707 may include a web connection socket or a UDP connection socket as described above. In some examples, the web socket or UDP socket may be visible only on the local network 709. The local network 709 may be a home Wi-Fi network or a proxy network. The opened connection socket 707 is used during a direct Wi-Fi flow of mirrored video content sent to the mirrored screen viewable in the glasses 100.

Receipt of the instruction contained in the "start mirroring" message also launches, in operation 718, a mirroring lens operated by the lenses application 708. The mirroring lens may include the optical element 126 or the optical element 128, or both. In operation 720, a "loading" or spinner state may be generated by the lenses application 708. An icon representing this loading state may be displayed in the screen of the smart device or the glasses. In operation 722, connection information (including the new connection socket 707 information) is collected by the glasses real-time service 706 and sent, in operation 724, over BLUETOOTH® connection 705 to the messaging application 702. The connection information may include a local IP address, port, and encryption information.

In operation 726, the messaging application 702 launches the mirroring extension 704 and provides the mirroring extension 704 with the connection information. The mirroring extension 704 now assumes responsibility for maintaining the connection. In operation 728, the mirroring extension 704 initiates a handshake with the mirroring transport library 710 commonly accessible to both the mirroring extension 704 and the glasses real-time service 706 to verify the connection.

In row B of FIG. 7, if establishment of the connection is successful, a connection success signal is generated in operation 730. In operation 732, a connected state is set between the mirroring lens 126/128 and the glasses real-time service 706 at a mirroring service 734. A stream texture for the mirrored content is established in operation 736. In operation 738, a connected mirroring state is set over the mirroring extension 704, and in operation 740 the mirror extension is selected (invoked) by the user and shown to the user in operation 742. In operation 744, a "broadcast started" message is sent to the mirroring extension 704.

In row C of FIG. 7, in operation 746, for each frame of the broadcast media (mirroring stream) a series of buffering calls is made, and in operations 748 and 750 the frames are sent to the mirroring transport library 710. In operation 752, the streamed texture is updated with the frames for display in the mirroring lens. Encoding and decoding may be performed during operations 746 through 752.

In row D of FIG. 7, at the end of a mirroring session, in operation 754 the user closes the mirroring lens 126/128 and a series of disconnections 756 are made, as shown.

In some examples, the mirrored screen of the smart phone visible in the mirroring lens (or lenses) of the glasses may include a user interface. The user interface may be a virtual user interface visually identical (or at least similar) in appearance to the user interface displayed in the screen of the smart phone. In some examples, the user can manipulate the virtual user interface, or content displayed within it, using tracked hand gestures. The hand gestures are made and are observable by a human in the real-world. Thus, some examples enable the use of hand gestures and hand tracking to enable manipulation of a mirrored 2D phone displayed in a 3D augmented reality space presented in the glasses.

Figure 8:
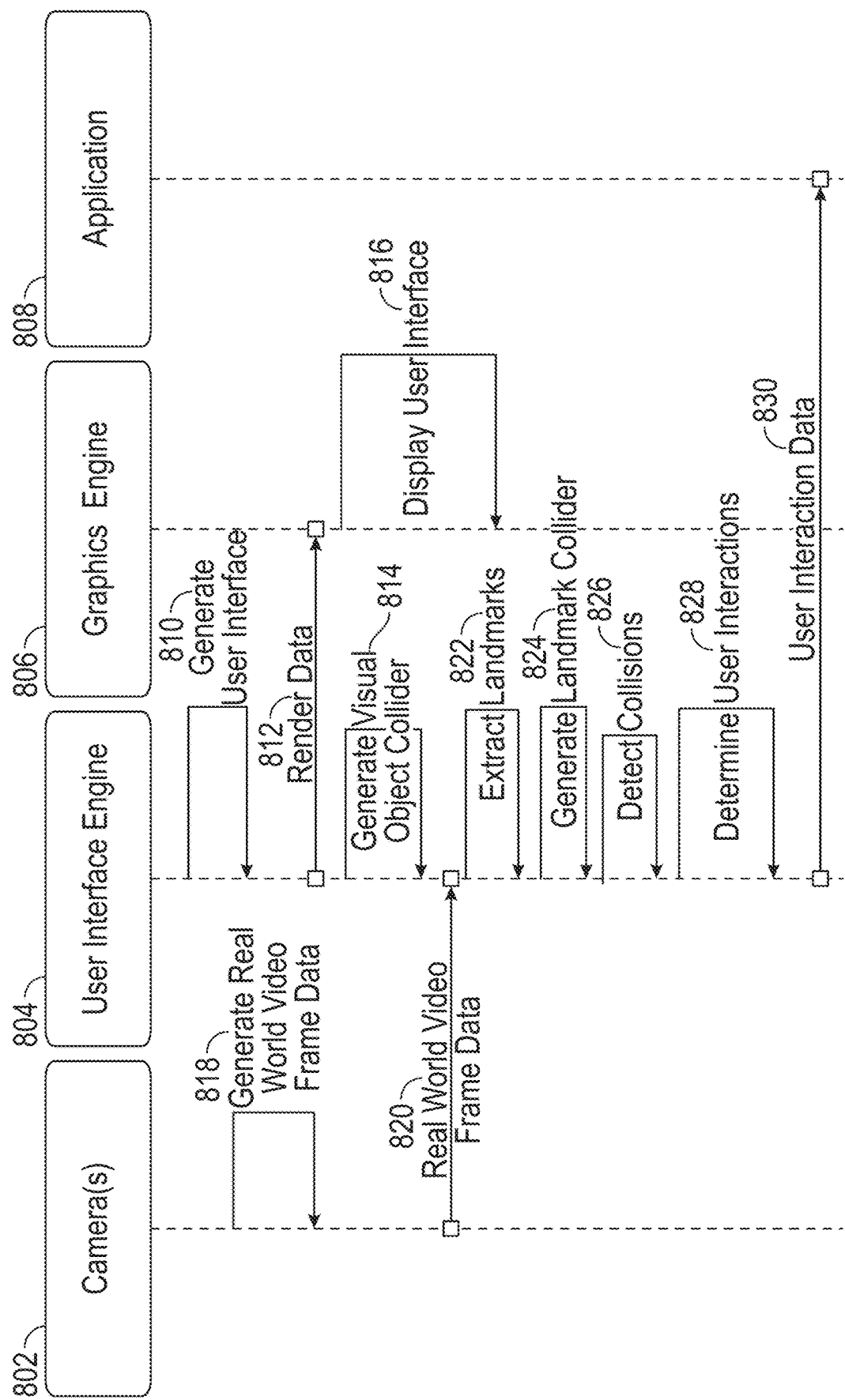
FIG. 8 depicts a sequence diagram of an example process for generating a user interface in a mirroring lens, in accordance with some examples.

FIG. 8 depicts a sequence diagram of an example process for generating a user interface in a mirroring lens in accordance with some examples. The mirroring lens may include the first or left optical element 126 and/or the second or right optical element 128 (FIG. 1). During the process, a user interface engine 804 generates 810 the user interface including one or more virtual objects that constitute interactive elements of the user interface. A virtual object may be described as a solid in a 3D geometry having values in 3-tuples of X (horizontal), Y (vertical), and Z (depth). A render of the user interface is generated and render data 812 is communicated to a graphics engine 806 and displayed 816 to a user in the mirroring lens. The user interface engine 804 generates 814 one or more virtual object colliders for the one or more virtual objects. At least one camera 802 generates 818 real-world video frame data 820 of the real-world as viewed by the user. The camera 802 may include one or more cameras 102 of a wearable device (FIG. 1), or one or more cameras of the client device (for example client device 228, FIG. 1) being mirrored, or any number of input sensors or peripheral devices in addition to the camera 802. Included in the real-world video frame data 820 is hand position video frame data of one or more of the user's hands within the render of the user interface by the graphics engine 806. Thus the real-world video frame data 820 captured by the camera 802 includes hand location video frame data and hand position video frame data of the user's hands as the user makes movements with their hands.

As mentioned herein, a collider (e.g., virtual object collider) refers to a software construct that can be attached at a particular area of the virtual object to enable tracking a location of the collider and detecting when a collision occurs between the collider and another virtual object (e.g., when the collider intersects with the other virtual object). In an example, when a second virtual object is attached with a collider, a collision event can be detected based on determining that a first collider of a first object has intersected the collider of the second virtual object. As discussed further herein, in response to detection of a collision event, user interface engine 804 can send user interaction data including such a collision event to a particular application (e.g., application 808) to enable the application to respond in a particular manner (e.g., perform a function or operation, and the like).

The user interface engine 804 utilizes the hand location video frame data and hand position video frame data in the real-world video frame data 820 to extract landmarks 822 of the user's hands from the real-world video frame data 820 and generates 824 landmark colliders for one or more landmarks on one or more of the user's hands. The landmark colliders are used to determine user interactions between the user and the virtual object by detecting collisions 826 between the landmark colliders and respective virtual object colliders of the virtual objects. The collisions are used by the user interface engine 804 to determine user interactions 828 by the user with the virtual objects. The user interface engine 804 communicates user interaction data 830 of the user interactions to an application 808 for utilization by the application 808.

In some examples, the application 808 performs the functions of the user interface engine 804 by utilizing various APIs and system libraries to receive and process the real-world video frame data 820 and instruct the graphics engine 806 to perform a particular operation(s). For example, a virtual user interface displayed in a mirroring lens can be resized or rotated using tracked hand gestures.

Although the above description relates to application 808, it is appreciated that in some embodiments, messaging client 304, application 306, or application 908 (discussed below) can perform the same operations as application 808.

Figure 9:
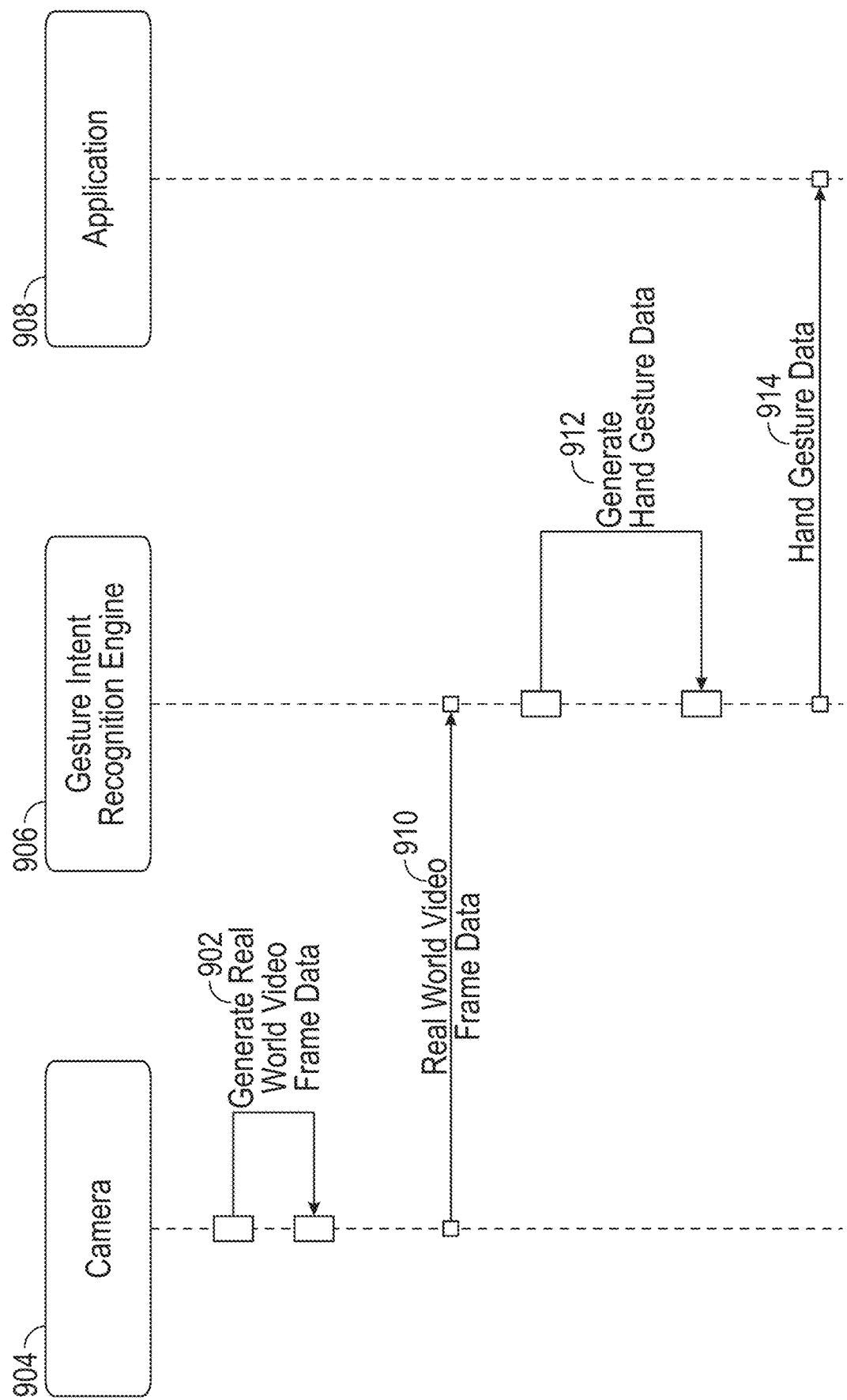
FIG. 9 depicts a sequence diagram of an example process for generating a user interface in a mirroring lens, in accordance with some examples.

FIG. 9 depicts a sequence diagram of an example process for generating a user interface in a mirroring lens in accordance with some examples. At least one camera 904 generates 902 real-world video frame data 910 of a real-world as viewed by a user. In an example, the at least one camera 904 can be provided by a particular client device such as client device 228, or by a glasses 100. Included in the real-world video frame data 910 is hand position video frame data of one or more of the user's hands. Thus the real-world video frame data 910 include hand location video frame data and hand position video frame data of the user's hands as the user makes movements with their hands. The gesture intent recognition engine 906 utilizes the hand location video frame data and hand position video frame data in the real-world video frame data 910 to generate 912 hand gesture data 914 including hand gesture categorization information indicating one or more hand gestures being made by the user. The gesture intent recognition engine 906 communicates the hand gesture data 914 to an application 908 that utilizes the hand gesture data 914 as an input from a user interface.

In some examples, the application 908 performs the functions of the gesture intent recognition engine 906 by utilizing various APIs and system libraries to receive and process the real-world video frame data 910 from the at least one camera 904 to determine the hand gesture data 914.

Although the above description relates to application 908, it is appreciated that in some embodiments, messaging client 304, application 306, or application 808 can perform the same operations as application 908.

Moreover, it is appreciated that user interface engine 804 and graphics engine 806 discussed above in FIG. 8 can process hand gesture data 914 to perform similar operations discussed above in FIG. 8. For example, user interface engine 804 can generate render data for a user interface based at least in part on hand gesture data 914, and graphics engine 806 can render such a user interface for display using the generated render data.

Figure 10:
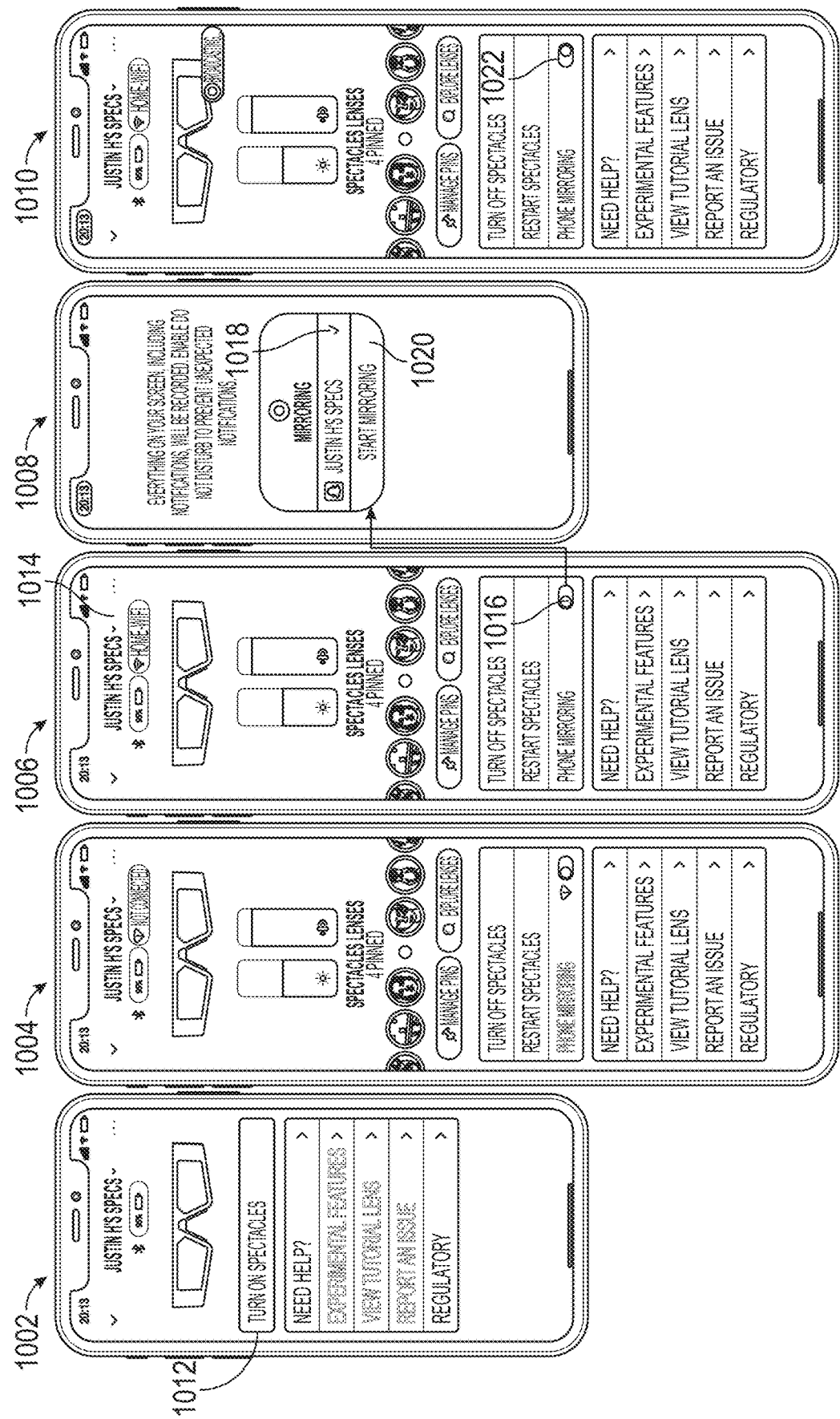
FIGS. 10-11 depict a series of example user interfaces, in accordance with various embodiments.
Figure 11:
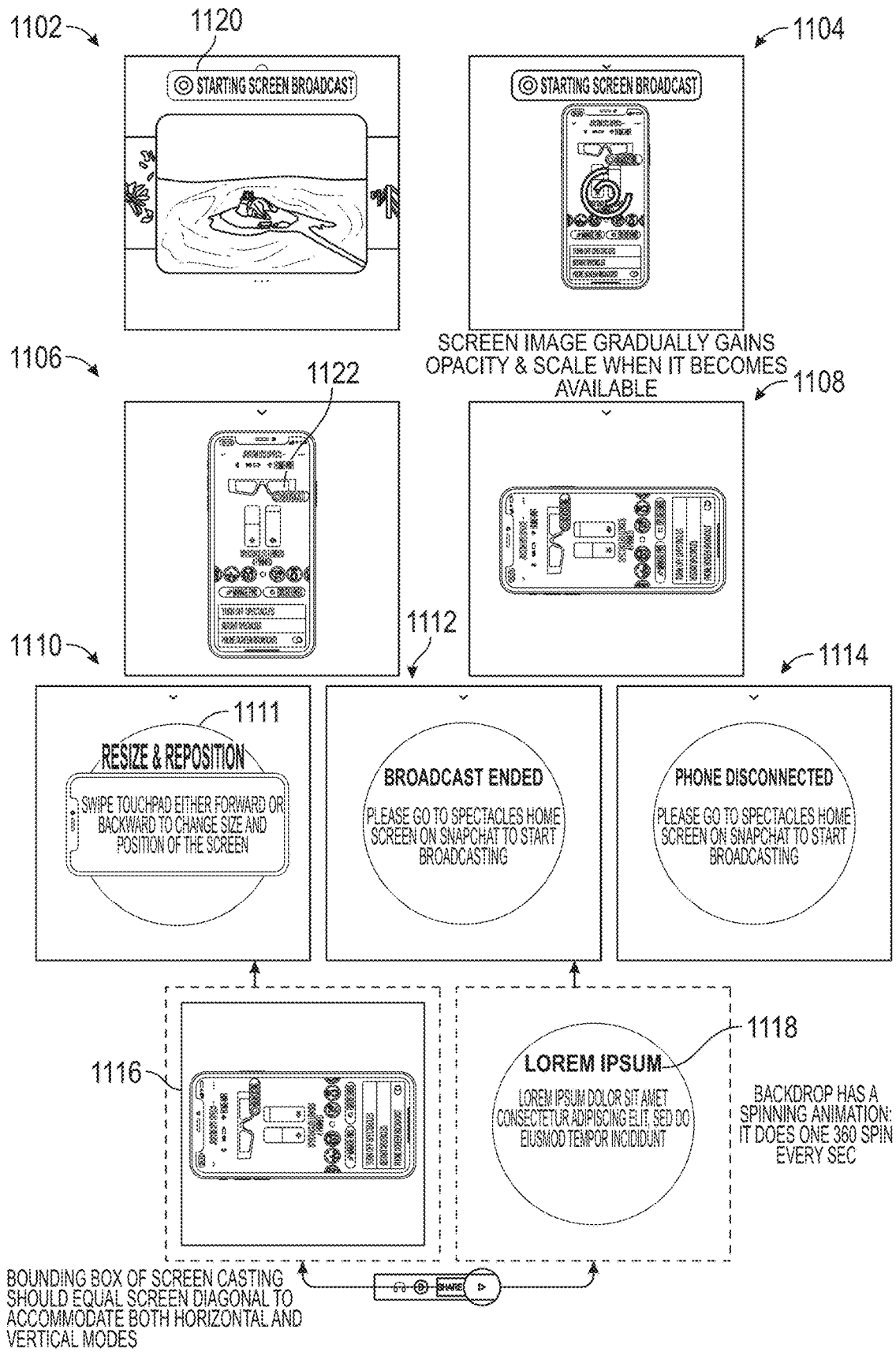

FIG. 10 depicts a series of example user interfaces 1002-1010 in accordance with various embodiments. In some examples, the series of example user interfaces is presented sequentially in the order shown for example during an initiation sequence to launch a mirroring of a screen of a client device 228 in glasses 100. The user interfaces 1002-1010 are initially presented in the client device 228 (such as a smart phone operated by the user 701 of FIG. 7) in some examples. The series of user interfaces depicted in FIG. 11 may subsequently be shown in a mirroring lens of a glasses 100 (such as the glasses worn by the user 701 of FIG. 7) upon completion of the mirroring process, for example as described above. Other numbers and/or sequences of interfaces are possible.

In interface 1002 of FIG. 10, a user 701 can "turn on spectacles" by selecting user interface engagement element 1012. This selection launches user interface 1004 and invokes a connection with a local network as described above. Upon successful connection with a local network, for example a "Home-Wi-Fi" network as shown at 1014 in user interface 1006, the user can select "phone mirroring" by selecting user interface engagement element 1016 to launch further operations in the mirroring process. The user interface 1008 offers the user a selection of one or more wearable devices (in this case "Justin H's Specs", as an example of the glasses worn by the user 701) in which to mirror the screen of the client device 228. The user 701 makes a choice in this regard by selecting user interface element 1018, for example. The user starts the mirroring over the established local network connection by selecting the user interface element 1020. A mirroring status is confirmed at 1022 in user interface 1010.

Returning to FIG. 11, in some examples the illustrated series of mirrored user interfaces 1102, 1104, 1106, 1108, 1110, 1112, and 1114 appears sequentially in the mirroring lens of the glasses 100 selected by the user for mirroring. In mirrored user interface 1102, confirmation is provided at 1120 of a starting screen broadcast (mirroring). In mirrored user interface 1104, for example, the mirrored screen image may gradually gain opacity and scale when the processed video frames become available pursuant to the network connection operations described further above. In the mirrored user interface 1106, a visually identical view of user interface 1010 is presented but is now presented in the mirrored user interface 1106 in which an icon "broadcasting" 1122 is displayed. The example mirrored user interface 1108 is shown in landscape orientation to indicate that, in some examples, a bounding box 1116 of the screen casting equals (or is greater than) the size of the diagonal dimension of the screen on the client device 228 so that reorientation of the mirrored screen displayed in the mirroring lens of the glasses 100 can be reoriented or resized by a user to appear in both horizontal and vertical modes.

A navigation facilitation message 1111 may be presented in the user interface 1110. An example message may include user instructions such as "Resize and reposition—swipe touchpad either forward or backwards to change size and position of the screen". The navigations instructions in the message 1111 may be followed and performed by a user 701 for example using the track pad 140 on the temple piece of the wearable device (glasses 100) described further above. For example, one horizontal swipe on the track pad 140 may resize the viewed screen by one step. A further swipe may resize the screen again, and a series of swipes may cycle the viewed screen through a series of sizes to suit, for example, different types of media or windows being viewed in the mirroring lens of the glasses 100. A tap on the track pad 140 (for example, independently or in association with a swipe) may rotate the viewed screen horizontally or vertically. Other track pad 140 navigation commands and configurations are possible.

In some examples, for the duration of a mirroring session, a viewed screen in the glasses or smart phone may include an intermittent spinning animation or text for example as shown at 1118 to indicate the mirroring status and local network connection. The end of a mirroring session, or an interruption in the connection of the local network, may be indicated by a "phone disconnected" message, for example as shown in user interface 1114.

In some examples, screen mirroring is performed as a background activity application enabling a user of a client device 228 or glasses 100 to conduct other activities on the client device 228 or the glasses 100 while the background mirroring application is running. For example, a user 701 may be able to interact with user interface engagement elements to navigate through viewed content and initiate device commands whether the viewed content is presented on the client device 228 or on the glasses 100, for example as mirrored content. In some examples, a mirrored screen presented in a mirroring lens of a glasses 100 includes a user interface 1202 described further below.

In some examples, a mirrored screen, for example depicting the user interface 1202, is "anchored" visually to a virtual location or a real-world location viewable through the lenses of the wearable device. In some examples, the mirrored screen is "body-anchored", in other words displayed in association with a part of the user's body, such as the user's head. In this mode, the mirrored screen may follow the movements of a user's head, for example, such that the mirrored screen in a 3D augmented reality space is always visible to the user in the lenses of the wearable device no matter which way the user turns their head from side to side, or up and down. In some examples, the mirrored screen is "world-anchored", in other words displayed in association with an external real-world location, such as an office wall or desk. In this mode, with the glasses 100 in place on the user's head, the mirrored screen is visible in the lenses of the glasses 100 when the user's gaze is directed to the relevant external real-world location, but is removed from view in the lenses (may even disappear) when the user's head is turned away from the real-world location. When the user's head is moved to return the view through the wearable glasses to the external location, the mirrored screen including the interface 1202 again appears. The mirrored screen may move into view (or disappear out of view) of the lenses horizontally from a side, or vertically from the top or bottom, or in other directions, of the lenses in proportion to movements of the user's head towards or away from the real-world location.

In some examples, a user can manipulate a mirrored screen to resize, rotate, reorientate, or reposition the mirrored screen, such as an interface 1202, in a mirroring lens, or change an anchored mode, using tracked hand gestures made in the real-world. Some examples allow user manipulation of a mirrored screen with a single hand, or both hands. In some examples, the gestures of a single or both hands are tracked to provide manipulation input data as described more fully below. Navigation of content displayed in the mirrored screen is also enabled for single- and double-handed use in some examples. Some examples enable 2D content, such as video footage (frames) or other media, to be presented in, or augment, a 3D space viewed through or in the lenses of a wearable device. Some examples allow manual or automatic anchoring (or "snapping") of video footage and other media to vertical and horizontal surfaces viewed in the 3D space.

Figure 12B:
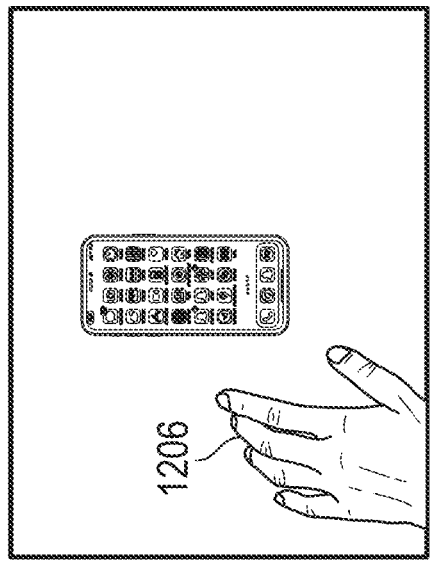
FIG. 12A-12Q illustrate example views displayed in a mirroring lens of a wearable device, in accordance with various embodiments.
Figure 12D:
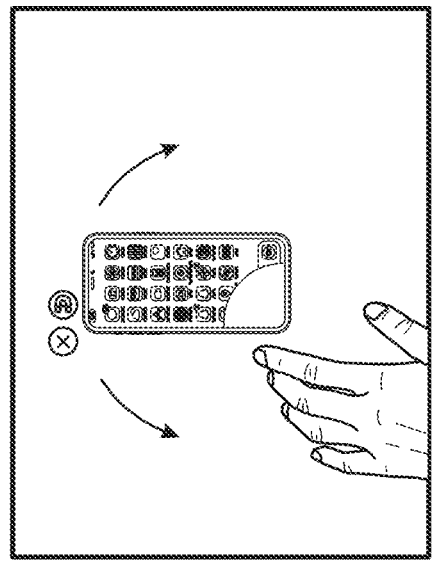
Figure 12A:
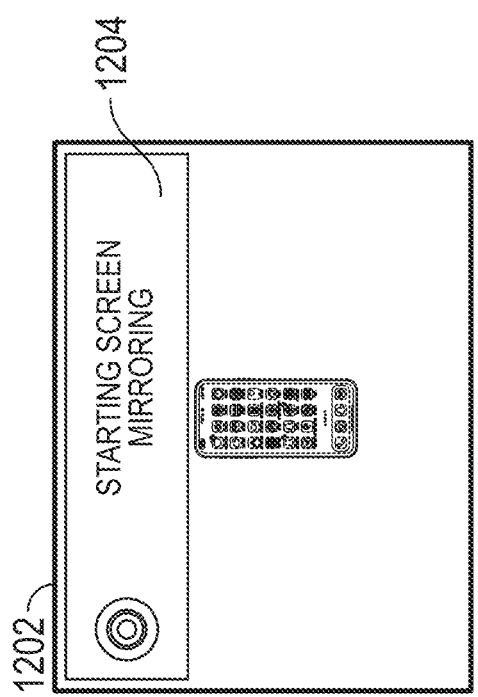
Figure 12C:
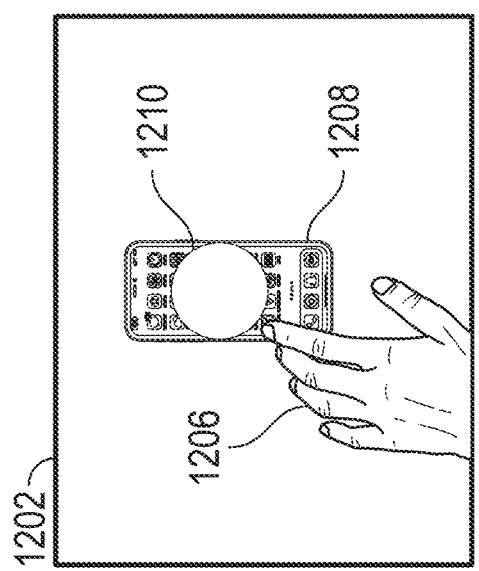
Figure 12E:
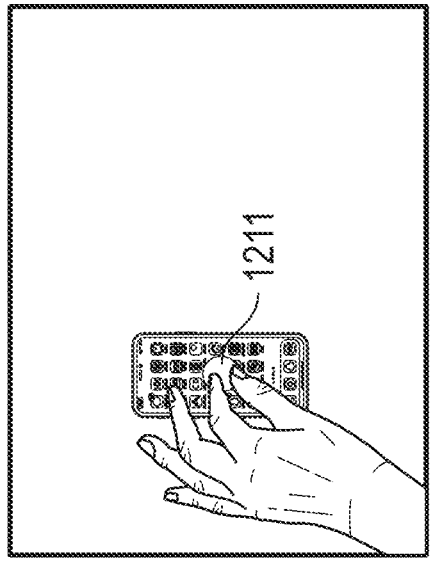
Figure 12F:
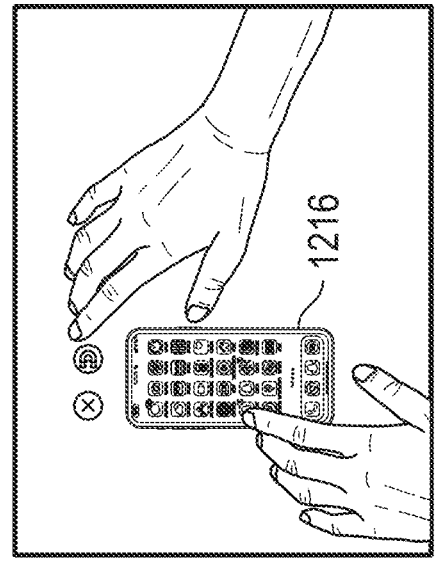
Figure 12G:
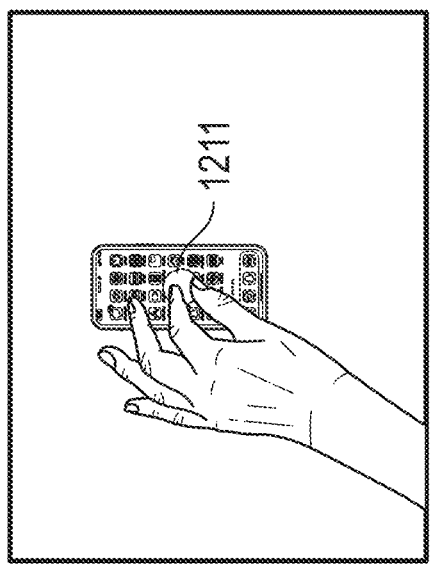
Figure 12H:
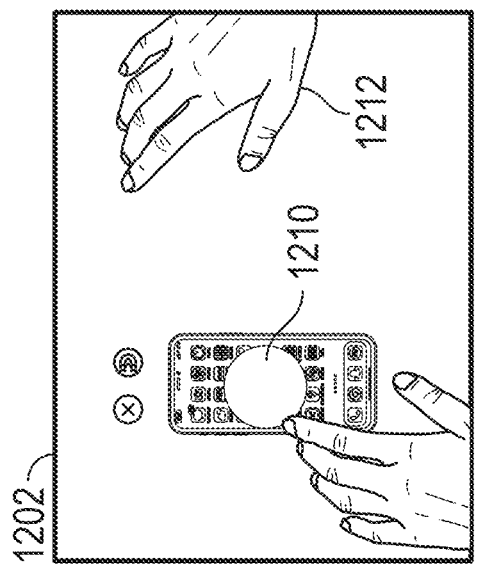
Figure 12J:
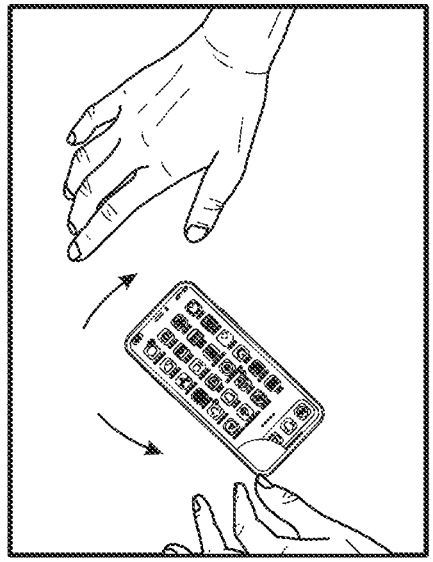
Figure 12L:
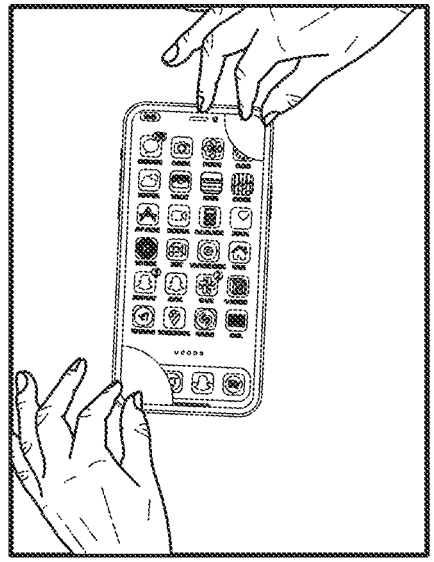
Figure 12I:
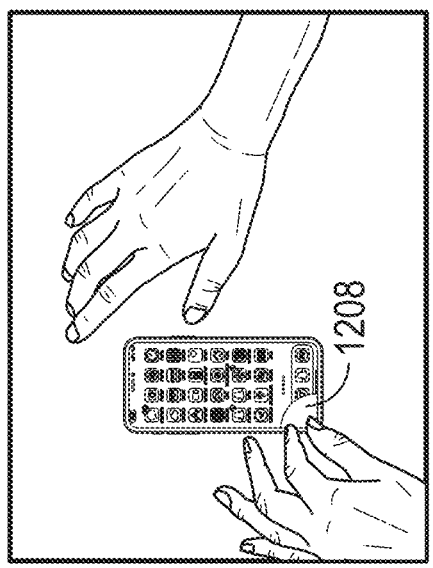
Figure 12K:
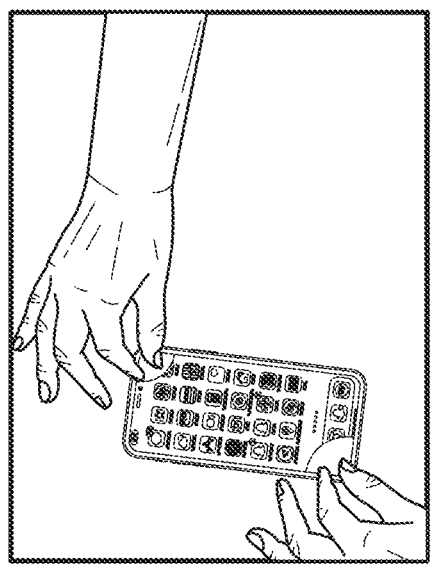
Figure 12M:
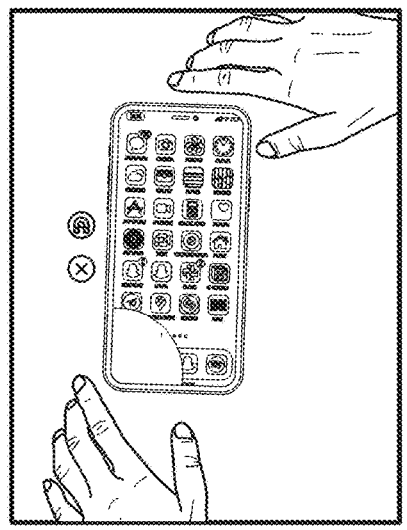
Figure 12N:
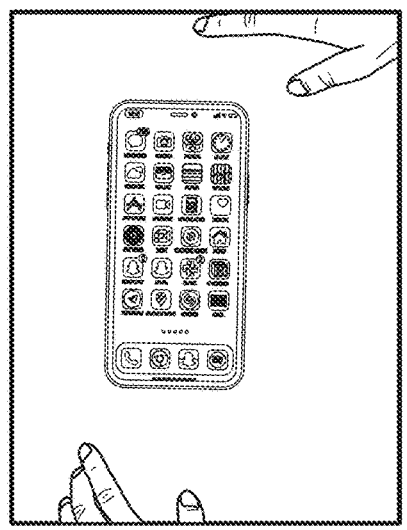
Figure 12O:
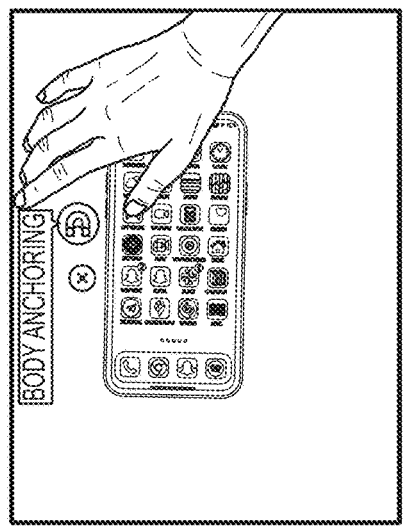
Figure 12P:
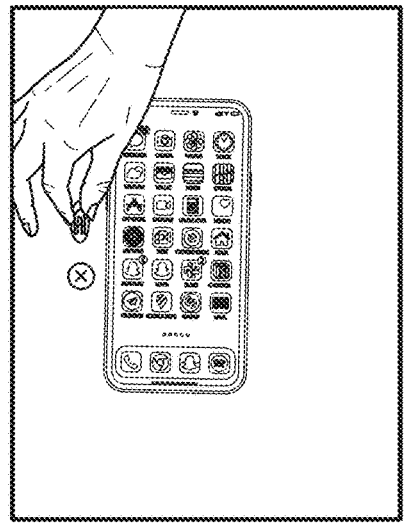
Figure 12Q:
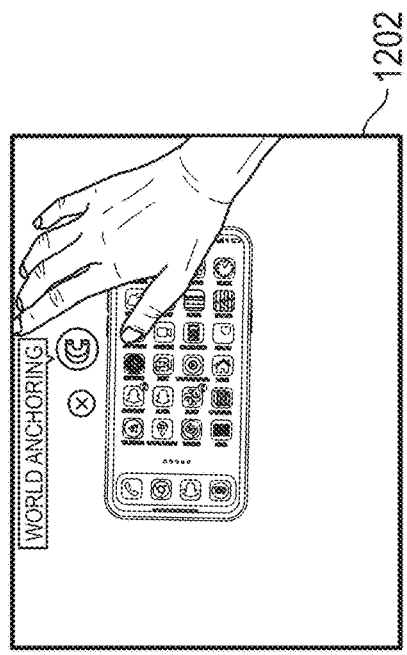

FIGS. 12A-12Q illustrate example views displayed or rendered in a mirroring lens of a glasses 100. The displayed or rendered views may include an example interface 1202 in accordance with various embodiments. The user interface 1202 may (or may not) be based on a mirrored screen of a client device 228 as described above. The example interface 1202 can be rendered for display on a client device (e.g., the client device 228) or in a wearable device (e.g., the glasses 100), such as through an interface(s) of the messaging client 304, application 306, and application 908. In the illustrated examples of FIGS. 12A-12Q, the screen of a client device 228 is mirrored in a mirroring lens of a wearable device, such as the glasses 100. When viewed in the glasses 100, the user interface 1202 may be considered a virtual interface augmenting a real-world view observable through the glasses 100.

In the mirrored screen view of FIG. 12A, a message 1204 is displayed above the virtual user interface 1202 notifying "starting screen mirroring". In some particular examples, images displayed within the user interface 1202 (for example, mirrored video frames broadcast from the client device 228) may initially appear with 0% opacity with a scale overshoot effect.

As shown in FIG. 12B, the screen view in the mirroring lens of the glasses 100 further includes a view of a user's single hand 1206 (for example a hand of user 701) observable adjacent to the user interface 1202. The user's hand 1206 is real and is viewable though the opaque mirroring lens of the glasses 100 in which the mirrored user interface 1202 is displayed. Real-world video frame data of the real-world relating to movement of the user's hand 1206 is tracked as described above by means of a camera or other imaging device or sensor on the wearable device, for example the camera 904, or the cameras 102 discussed above. The user interface 1202 is based on the mirrored screen of the client device 228 and augments the view seen by the user 701 in the glasses. The real-world video frame data may include data relating to one or both (see examples below) of the user's hands within or adjacent a render of the user interface 1202, and further includes hand location video frame data and hand position video frame data of the user's hands as the user makes movements with their hands.

As discussed above, the gesture intent recognition engine 906 utilizes the hand location video frame data and hand position video frame data in the real-world video frame data to generate hand gesture data including hand gesture categorization information indicating one or more hand gestures being made by the user. In an implementation, the gesture intent recognition engine 906 communicates the hand gesture data to an application that utilizes the hand gesture data as an input from a user interface. In some examples, the initial position of the user interface 1202 in the mirroring lens of the glasses 100 is set at a default comfort position, for example a position replicating a location 100-160 cm from the user's eyes. The user interface 1202 always faces the user and, in some examples, may reside in an imaginary sphere or circle around the user's head. In some examples, the mirrored screen is anchored to the user's head and implements a light soft or hazy follow effect.

In the examples of FIG. 12A-12Q, gesture intent recognition engine 906 analyzes real-world video frame data to locate or generate hand location video frame data and hand position video frame data of the user's hand as the user makes movements with their hand. In this example, the gesture intent recognition engine 906 utilizes the hand location video frame data and hand position video frame data in the real-world video frame data to generate hand gesture data including hand gesture categorization information indicating a hand gesture being made by the user that indicates, for example, a gesture and instruction to perform certain navigations within or manipulations of the virtual interface 1202. The navigations or manipulations may include one or more of a hover, a resize, a reorientation, a rotation, and a repositioning of the virtual user interface 1202 displayed in the mirroring lens of the wearable device, or to navigate content displayed within the user interface 1202.

The examples described in the following discussion of FIGS. 12C-12Q are a continuation of the discussion above of FIGS. 12A-12B.

For example, FIG. 12C illustrates a view in a mirroring lens in which the user's hand appears to hover over the user interface 1202 in accordance with various embodiments. In an implementation, the user's hand 1206 is tracked and observed to move, under the user's navigation of his or her hand, within a periphery of the virtual interface 1202, as shown for example. In some examples, a hover mode is triggered by a detection of the user placing their hand over the mirrored 2D display of the client device 228. In response, a semi-transparent border 1208 on the user interface 1202, and a semi-transparent circle 1210 in the middle, is displayed to signify engagement of a "reposition interface" mode. In some examples, to reduce false positives, a hover is activated to reposition the mirrored screen only when the user is detected as looking at the mirrored screen and with the hand pointing at the mirrored screen. This arrangement may be applicable to the world anchoring mode only, but various other configurations using body anchoring are possible.

In other arrangements in FIG. 12D, a hover causes the user interface 1202 to move (snap) either to the center of the view in the glasses as shown, or to a corner thereof. A detected (tracked) hand gesture representing a tap at the center of the user interface 1202 causes a repositioning of the user interface 1202, and a detected hand gesture representing a tap at corner of the user interface 1202 causes a rotation of the user interface 1202.

In FIGS. 12E-12F, detected pinch and expand hand or finger gestures may also be used to reposition or expand the user interface 1202, or navigate content displayed with it by engaging other user interface interactive elements, such as the semi-transparent circle 1211.

In the view of FIG. 12G, a user's second hand 1212 is detected.

In the view of FIG. 12H, when the user's second hand 1212 is tracked and detected as being within a threshold viewed proximity to the user interface 1202, a hover for example denoted by a semi-transparent border 1216 signifies that the user can now use both hands, i.e. the first hand 1206 and the second hand 1212, to generate tracked gestures to manipulate the user interface 1202, or navigate content displayed within the user interface 1202.

A tracked pinch or grab gesture made by one or both hands, for example as depicted in FIGS. 12I-12J and denoted by a semi-transparent corner tab 1218, engages a user interface 1202 rotation mode. Here, the user interface 1202 depicted in the mirrored screen can be rotated in the glasses view based on tracked movements of both hands. In some examples, the user interface 1202 rotates based on tracked hand gestures about a rotation anchor in the center of the mirrored screen.

In FIGS. 12K-12N, tracked hand gestures representing a "grabbing" by the user of the interface 1202 with both hand 1206 and hand 1212 allows the user to scale, rotate and reposition the mirrored screen in one operation or over several series of operations.

In FIGS. 12O-12Q, tracked hand gestures representing a pinching of an anchoring mode icon 1222 enable a user to change between body anchoring and world anchoring modes, and associated views of the mirrored screen and the user interface 1202.

Thus, various hover, resize, rotate, reposition, anchoring and other gestures, as illustrated in FIGS. 12A-12Q, correspond to gestures where one (or both) of the user's hands has moved in a pinch, move, or tap gesture and has been tracked in the real-world. Thus, a resize gesture may correspond to a first gesture of the aforementioned real-world movements and positions, and a rotate gesture may correspond to a second gesture of the same movements and positions. Various other combinations of gestures and corresponding movements are possible. In this fashion, a "hands-free" (or touchless) approach to manipulating a mirrored screen or navigating content displayed within it can be provided where the user does not have to return to a client device and perform such actions on a screen of the client device (e.g., through a touch or tap gesture or input).

Some examples address technical challenges arising not only in making an initial connection to a local network to support screen mirroring session, but also in maintaining continuity of a mirroring session. Typically, some examples prioritize connections over a local network since they are low latency and require no additional action from the user. However, some glasses users are not always at home on a local Wi-Fi network. Some present examples establish low latency connections for mirroring while a user is not on Wi-Fi. To this end, some examples initiate a glasses web proxy flow, and then reattempt a mirroring connection.

Thus, some examples include a system comprising: a processor implementing a local wireless network; and a memory including instructions that, when executed by the processor, cause the processor to perform operations comprising: receiving, by one or more hardware processors, a request for mirrored video content, the request initiated by a user at a client device to mirror video content displayed in a screen of the client device in a mirroring lens of a wearable device, the wearable device connected to the client device by a short-range wireless connection; in response to receiving the request, communicating with a messaging application implementing at the client device to send an instruction, via the short-range wireless connection, to a realtime service implementing at the wearable device to identify and open a connection socket, the connection socket visible only in a local wireless network; based on a successful opening of the connection socket, by the one or more hardware processors, using the open connection to the local wireless network to direct a flow of mirrored video content from the client device to a lenses application implementing a mirroring lens at the wearable device; while mirrored video content is being displayed in the mirroring lens of the wearable device, tracking, by the one or more hardware processors, hand gestures of a user using the wearable device to view the mirrored video content displayed in the mirroring lens of the wearable device; processing, by the one or more hardware processors, navigational or manipulation data based on the tracked hand gestures; and sending a navigation or manipulation instruction to the lenses application to adjust a view of the mirrored video content based on the tracked hand gestures.

In some examples, the mirrored video content displayed in the mirroring lens of the wearable device augments a real-world view of the user wearing the wearable device, the real-world view including a real-world view of a user's hand making the tracked hand gestures.

In some examples, the video content displayed in the screen of the client device includes a display of an interactive user interface for receiving user inputs into the client device, and wherein the mirrored video content displayed in the mirroring lens of the wearable device includes a virtual user interface based in appearance on the interactive user interface displayed in the client device.

In some examples, the virtual user interface displayed in the mirroring lens of the wearable device is a visual replica of the interactive user interface displayed in the screen of the client device.

In some examples, an identified hand gesture among the hand gestures tracked by the one or more hardware processors is associated with a desired user navigation or manipulation of the virtual user interface displayed in the mirroring lens of the wearable device, and wherein a navigation or manipulation instruction based on the desired user navigation or manipulation is included in the navigation or manipulation instruction to the client device or the mirroring lens processor of the wearable device.

In some examples, the navigation or manipulation instruction based on the identified hand gesture is associated with one or more of a hover, a resize, a reorientation, a rotation, and a repositioning of the virtual user interface displayed in the mirroring lens of the wearable device.

In some examples, the operations further comprise causing or performing, by the one or more hardware processors, a navigation or manipulation of the virtual user interface displayed in the mirroring lens of the wearable device based on a received navigation or manipulation instruction.

In some examples, the identified hand gesture includes one of a finger pinch hand gesture, a single hand gesture, or a double-handed gesture.

In some examples, a non-transitory computer-readable medium comprises instructions, which when executed by a computing device, cause the computing device to perform operations summarized above, or described elsewhere herein.

Figure 13:
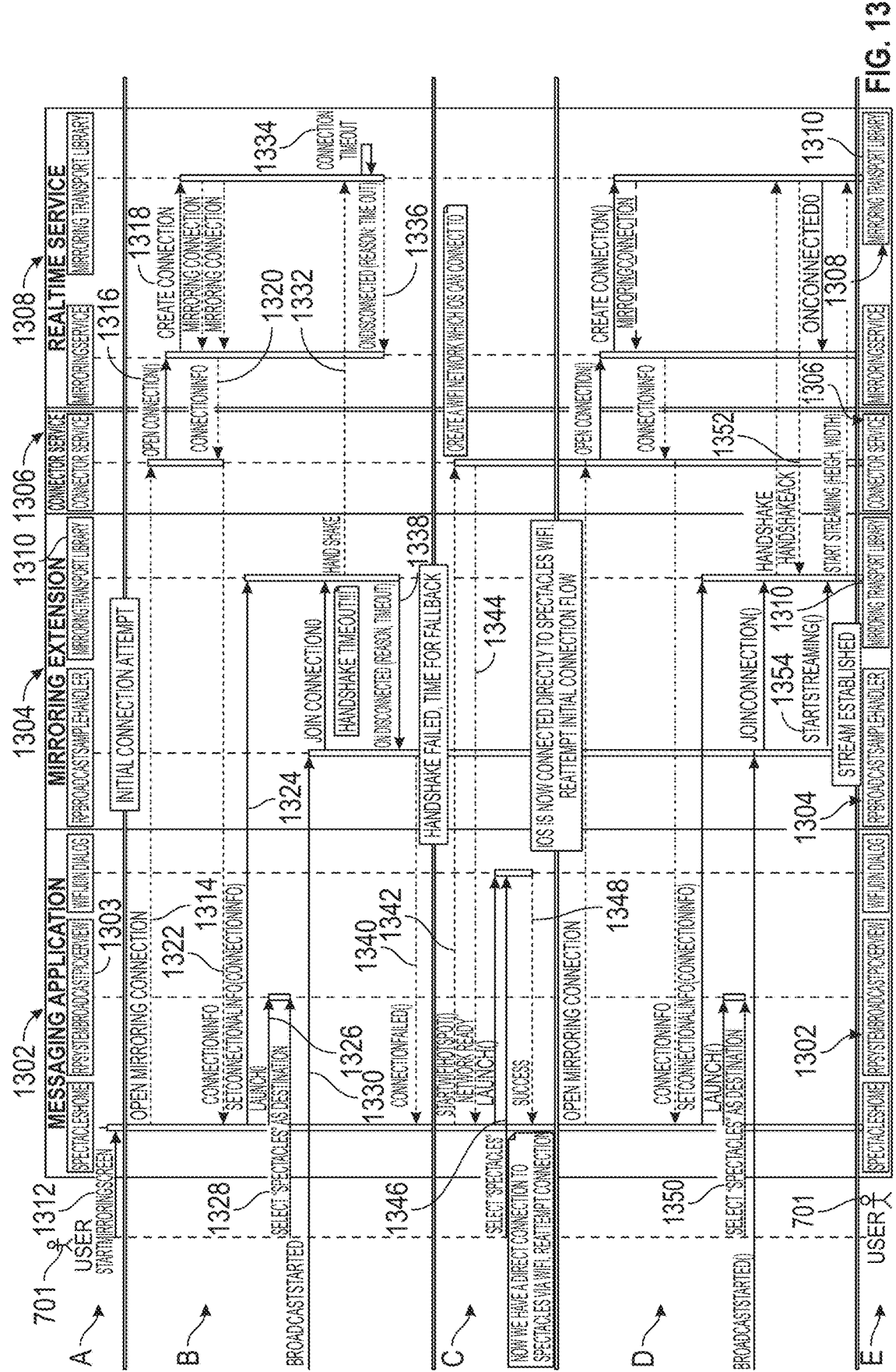
FIG. 13 depicts a sequence diagram of an example process for connecting to a local proxy network to mirror a screen of a client device, in accordance with some examples.

FIG. 13 depicts a sequence diagram of an example process for connecting to a proxy network to mirror a screen of a client device (e.g., a smart phone) in a wearable device (e.g., glasses), in accordance with some examples. Some examples include a web proxy flow. At a high level, in some examples, a user 701 can select, on a client device 228, a user interface engagement element, such as a button or icon, displayed in a home page of a messaging application, to share a cell network with a wearable device, such as the glasses 100.

Upon selecting this engagement element, the messaging application sends a BLUETOOTH® message (or other short-range wireless message) to an application or connection service running on the wearable device (e.g., glasses 100) instructing the application or connection service to create a proxy Wi-fi network and connect the wearable device to the proxy Wi-Fi network. Then, on the client device 228, the user is prompted to join the proxy W-Fi network to connect the client device 228 to the proxy Wi-Fi network. After doing so, the client device 228 and the wearable device (glasses 100) are both joined to the same local proxy Wi-Fi network. Web requests from the wearable device are made using the client device's cell connection via a proxy in the messaging application. Web requests may be based on user navigation using the track pad 140, or based on tracked hand gestures in conjunction with a mirrored screen depicting a user interface 1202 as described above, in some examples.

For mirroring purposes, some examples use the flow depicted in FIG. 13 to create a local network that can be used for low latency mirroring. Even if the client device 228 does not have a cell signal, examples will still have an established local proxy network for a mirroring connection. In some examples, and with reference again to the process flow of FIG. 7 above, if the messaging application (on the client device 228) fails to connect to the mirroring connection, it will automatically initiate a proxy flow by sending a BLUETOOTH® (or other short-range) message to the wearable device (specifically the abovementioned connection service in some examples) instructing the connection service to create a proxy Wi-Fi network. On the client device 228, the user is prompted in a user interface to join the proxy Wi-Fi network to connect the client device 228 to the proxy Wi-Fi network. After doing so, the client device 228 and the wearable device (glasses 100) are both joined to the same local proxy Wi-Fi network and mirroring can commence, as described further above, for example with reference to FIG. 7 and subsequent figures. While connected to the proxy local network, some examples automatically reattempt the mirroring connection process using a local Wi-Fi network (e.g., home Wi-Fi) as described in above sections.

With reference again to FIG. 13, this view depicts a sequence diagram of an example process using a proxy network for mirroring a screen of a client device (e.g., the client device 228, referred to for simplicity of explanation in this example without limitation as a smart phone) in a wearable device (e.g., the glasses 100, referred to in this example for simplicity of explanation in this example without limitation as glasses) in accordance with some examples.

In the view, the two leftmost columns represent respectively a messaging application 1302 and a mirroring application extension, or simply a mirroring extension 1304. In some examples, the messaging application 1302 and the mirroring extension 1304 execute on the smart phone. The two rightmost columns represent a connector service 1306 executing on the glasses (for example on the computer 132 of the glasses 100, FIG. 1) and a glasses real-time service 1308 also executing on the glasses 100 (for example on the computer 132). In some examples, a lenses application runs a mirroring lens core component and operates the lenses viewable in the glasses. The lenses may include for example the first or left optical element 126 and the second or right optical element 128 of FIG. 1. A mirroring transport library 1310 is shared between the mirroring extension 1304 and the glasses real-time service 1308. In the example operations that follow, some include BLUETOOTH® (or other short-range) messages, failed Wi-Fi requests over a socket connection on a local network (for example a home Wi-Fi), and successful Wi-Fi requests over a socket connection on local network (for example a proxy network).

In row A of FIG. 13, a user 701 initiates a mirroring process by operating the smart phone to send, in operation 1312, an instruction to the messaging application 1302 to start mirroring the smart phone screen in the glasses. As mentioned above, user commands may be sent, processed, and/or received using an RPC system 1303.

In row B of FIG. 13, an initial mirroring connection attempt is made. In operation 1314, using an existing BLUETOOTH® connection (or other short range connection), the messaging application 1302 instructs the connector service 1306 to open a mirroring connection, for example a socket connection visible only on a local network as described further above in reference to FIG. 7. In operation 1316, the connector service relays this instruction to the glasses real-time service 1308. In operation 1318, the glasses real-time service 1308 creates a mirroring connection and, in operation 1320, returns the connection information (for example IP address, port, encryption) to the connector service 1306. In operation 1322, the connector service 1306 sends the connection information to the messaging application 1302 over the BLUETOOTH® connection. In operation 1324, the messaging application 1302 provides the mirroring extension 1304 with the connection information and, in operation 1326, launches the mirroring extension 1304. In operation 1328, the user selects the glasses as a destination for the mirroring (broadcast) to attempt a broadcast start in operation 1330.

The mirroring extension 1304 has assumed responsibility for maintaining the connection. In operation 1332, the mirroring extension 1304 initiates a handshake with the mirroring transport library 1310 commonly accessible to both the mirroring extension 1304 and the glasses real-time service 706 to verify the connection. Unlike the FIG. 7 example, in this example the handshake is not returned and it times out at 1334. A connection failed message is communicated by the glasses real-time service 1308 via the mirroring extension 1304 to the messaging application 1302 in operations 1336, 1338, and 1340.

In row C of FIG. 13, the handshake has failed, invoking a fallback procedure. In some examples, the fallback procedure establishes and uses a proxy network. In operation 1342, the messaging application 1302 instructs the connector service 1306 to create a (proxy) Wi-Fi network that the messaging application 1302 (or the smart phone itself using native functionality) can connect to. The connector service 1306 creates the proxy network and in operation 1344, communicates a network ready message to the messaging application 1302. In operation 1346, the user selects the glasses to join the proxy Wi-Fi network, and in operation 1348 a success message is returned.

In row D of FIG. 13, the messaging application 1302 is now connected to the same proxy Wi-Fi network as the glasses. The operations of the initial connection flow of row A are repeated, as shown, including a selection by the user in operation 1350 of the glasses as a destination for the mirroring (broadcast). This time the handshake is successful and a handshake acknowledgment is returned in operation 1352. In operation 1354, a mirroring stream is started using the successfully established connection on the proxy Wi-Fi network.

In row E of FIG. 13, the user enjoys a mirroring session and interacts with a mirrored screen in a mirroring lens of the glasses to interact with one or more user interfaces, such as user interfaces 1102-1114 and 1202 described above with reference to FIG. 11 and FIGS. 12A-12Q, for example.

Figure 14:
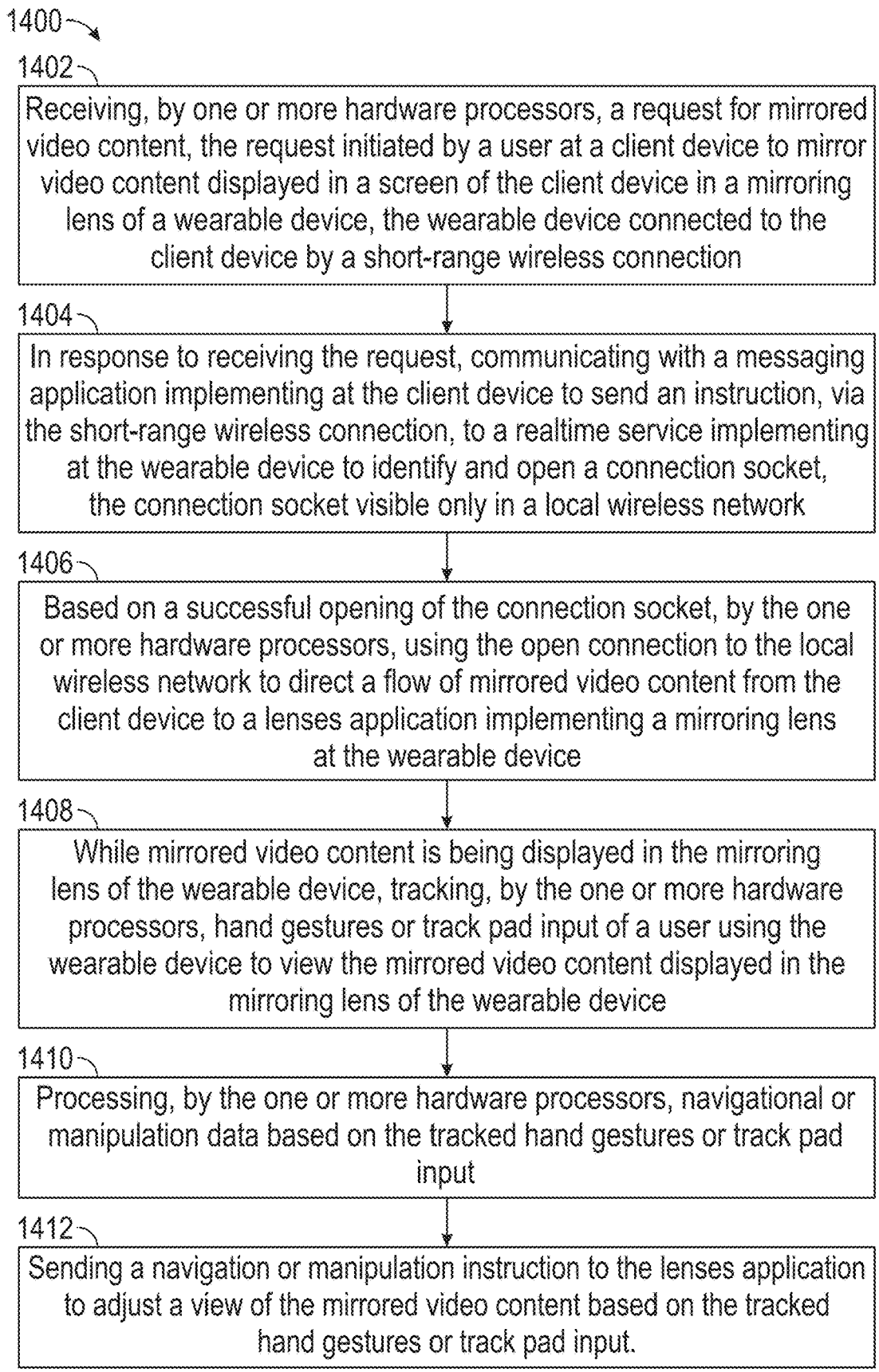
FIG. 14 is a flowchart illustrating a method, according to certain example embodiments.

FIG. 14 is a flowchart illustrating a method 1400, according to certain example embodiments. The method 1400 may be embodied in computer-readable instructions for execution by one or more computer processors such that the operations of the method 1400 may be performed in part or in whole by the messaging client 304, particularly with respect to respective components described above in FIG. 8 and FIG. 9, or an application (e.g., application 306) executing on a given client device (e.g., client device 228) that is communicating in conjunction with messaging server system 308 and components thereof; accordingly, the method 1400 is described below by way of example with reference thereto. However, it shall be appreciated that at least some of the operations of the method 1400 may be deployed on various other hardware configurations and the method 1400 is not intended to be limited to the messaging client 304 or any components or systems mentioned above.

The operations described in FIG. 14, in an embodiment, correspond to at least the description of operations as discussed above. An example method 1400 comprises: at operation 1402, receiving, by one or more hardware processors, a request for mirrored video content, the request initiated by a user at a client device to mirror video content displayed in a screen of the client device in a mirroring lens of a wearable device, the wearable device connected to the client device by a short-range wireless connection; at operation 1404, in response to receiving the request, communicating with a messaging application implementing at the client device to send an instruction, via the short-range wireless connection, to a realtime service implementing at the wearable device to identify and open a connection socket, the connection socket visible only in a local wireless network; at operation 1406, based on a successful opening of the connection socket, by the one or more hardware processors, using the open connection to the local wireless network to direct a flow of mirrored video content from the client device to a lenses application implementing a mirroring lens at the wearable device; at operation 1408, while mirrored video content is being displayed in the mirroring lens of the wearable device, tracking, by the one or more hardware processors, hand gestures or track pad input of a user using the wearable device to view the mirrored video content displayed in the mirroring lens of the wearable device; at operation 1410, processing, by the one or more hardware processors, navigational or manipulation data based on the tracked hand gestures or track pad input; and, at operation 1412, sending a navigation or manipulation instruction to the lenses application to adjust a view of the mirrored video content based on the tracked hand gestures or track pad input.

In some examples, the mirrored video content displayed in the mirroring lens of the wearable device augments a real-world view of the user wearing the wearable device, the real-world view including a real-world view of a user's hand making the tracked hand gestures.

In some examples, the video content displayed in the screen of the client device includes a display of an interactive user interface for receiving user inputs into the client device, and wherein the mirrored video content displayed in the mirroring lens of the wearable device includes a virtual user interface based in appearance on the interactive user interface displayed in the client device.

In some examples, the virtual user interface displayed in the mirroring lens of the wearable device is a visual replica of the interactive user interface displayed in the screen of the client device.

In some examples, an identified hand gesture among the hand gestures tracked by the one or more hardware processors is associated with a desired user navigation or manipulation of the virtual user interface displayed in the mirroring lens of the wearable device, and wherein a navigation or manipulation instruction based on the desired user navigation or manipulation is included in the navigation or manipulation instruction to the client device or the mirroring lens processor of the wearable device.

In some examples, the navigation or manipulation instruction based on the identified hand gesture is associated with one or more of a hover, a resize, a reorientation, a rotation, and a repositioning of the virtual user interface displayed in the mirroring lens of the wearable device.

In some examples, the operations further comprise causing or performing, by the one or more hardware processors, a navigation or manipulation of the virtual user interface displayed in the mirroring lens of the wearable device based on a received navigation or manipulation instruction.

In some examples, the identified hand gesture includes a finger pinch hand gesture.

In some examples, the identified hand gesture includes a single hand gesture.

In some examples, the identified hand gesture includes a double-handed gesture.

In some examples, the operations further comprise, based on an unsuccessful opening of the connection socket, causing an automatic identification and fallback connection to a proxy local wireless network to direct a flow of mirrored video content from the client device to the lenses application.

Although the described flow charts and sequence diagrams described herein can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Machine Architecture

Figure 15:
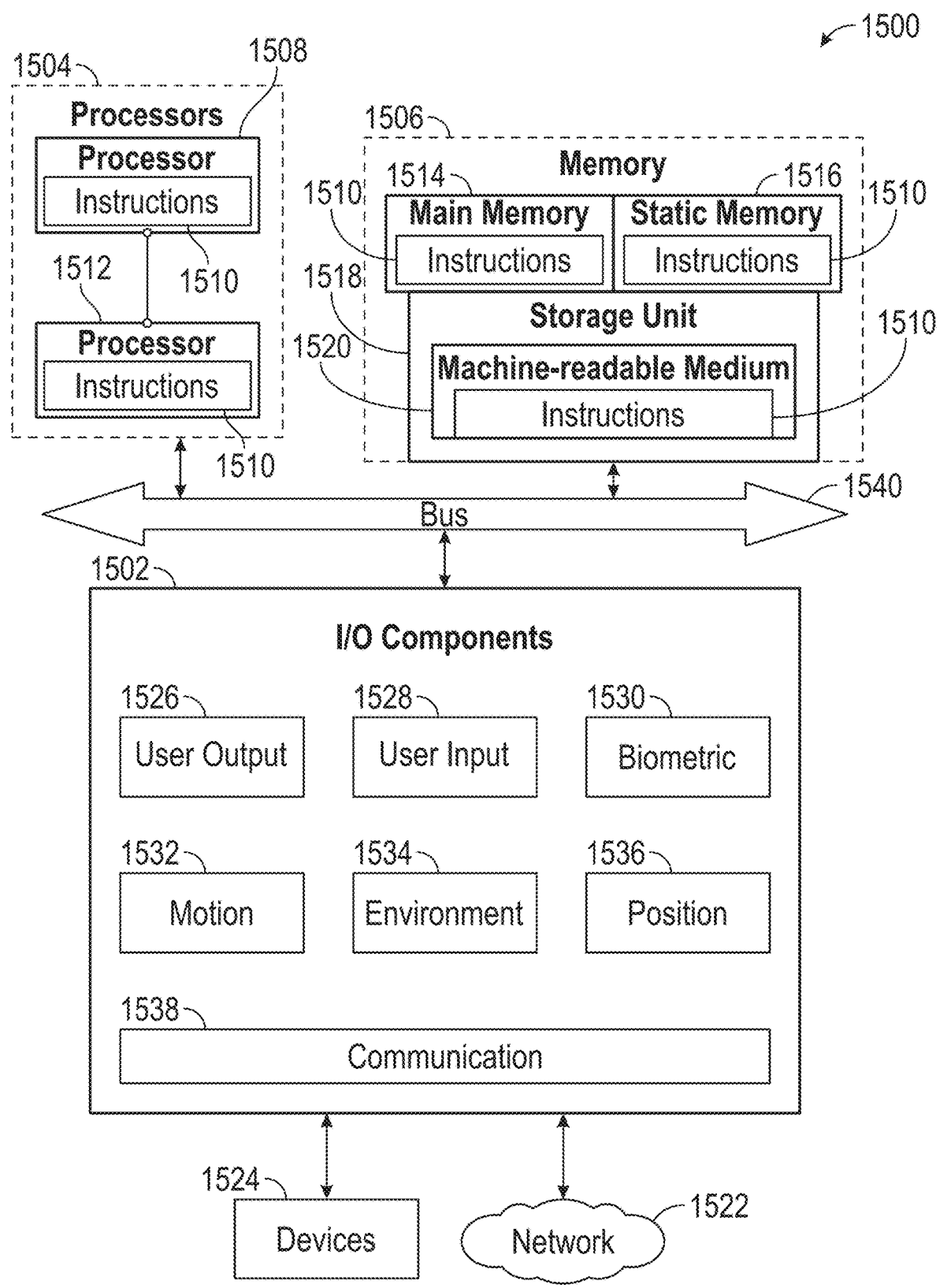
FIG. 15 is a diagrammatic representation of a machine in the form of a computer system within which a set of instructions may be executed for causing the machine to perform any one or more of the methodologies discussed herein, in accordance with some examples.

FIG. 15 is a diagrammatic representation of the machine 1500 within which instructions 1510 (e.g., software, a program, an application, an applet, an app, or other executable code) for causing the machine 1500 to perform any one or more of the methodologies discussed herein may be executed. For example, the instructions 1510 may cause the machine 1500 to execute any one or more of the methods described herein. The instructions 1510 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1510, sequentially or otherwise, that specify actions to be taken by the machine 1500. Further, while only a single machine 1500 is illustrated, the term "machine" shall also be taken to include a collection of machines that individually or jointly execute the instructions 1510 to perform any one or more of the methodologies discussed herein. The machine 1500, for example, may comprise the client device 228 or any one of a number of server devices forming part of the messaging server system 308. In some examples, the machine 1500 may also comprise both client and server systems, with certain operations of a particular method or algorithm being performed on the server-side and with certain operations of the particular method or algorithm being performed on the client-side.

The machine 1500 may include processors 1504, memory 1506, and input/output I/O components 1502, which may be configured to communicate with each other via a bus 1540. In an example, the processors 1504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1508 and a processor 1512 that execute the instructions 1510. The term "processor" is intended to include multi-core processors that may comprise two or more independent processors (sometimes referred to as "cores") that may execute instructions contemporaneously. Although FIG. 15 shows multiple processors 1504, the machine 1500 may include a single processor with a single-core, a single processor with multiple cores (e.g., a multi-core processor), multiple processors with a single core, multiple processors with multiples cores, or any combination thereof.

The memory 1506 includes a main memory 1514, a static memory 1516, and a storage unit 1518, both accessible to the processors 1504 via the bus 1540. The main memory 1506, the static memory 1516, and storage unit 1518 store the instructions 1510 embodying any one or more of the methodologies or functions described herein. The instructions 1510 may also reside, completely or partially, within the main memory 1514, within the static memory 1516, within machine-readable medium 1520 within the storage unit 1518, within at least one of the processors 1504 (e.g., within the Processor's cache memory), or any suitable combination thereof, during execution thereof by the machine 1500.

The I/O components 1502 may include a wide variety of components to receive input, provide output, produce output, transmit information, exchange information, capture measurements, and so on. The specific I/O components 1502 that are included in a particular machine will depend on the type of machine. For example, portable machines such as mobile phones may include a touch input device or other such input mechanisms, while a headless server machine will likely not include such a touch input device. It will be appreciated that the I/O components 1502 may include many other components that are not shown in FIG. 15. In various examples, the I/O components 1502 may include user output components 1526 and user input components 1528. The user output components 1526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1502 may include biometric components 1530, motion components 1532, environmental components 1534, or position components 1536, among a wide array of other components. For example, the biometric components 1530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1532 include acceleration sensor components (e.g., accelerometer), gravitation sensor components, rotation sensor components (e.g., gyroscope).

The environmental components 1534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 228 may have a camera system comprising, for example, front cameras on a front surface of the client device 228 and rear cameras on a rear surface of the client device 228. The front cameras may, for example, be used to capture still images and video of a user of the client device 228 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 228 may also include a 560° camera for capturing 560° photographs and videos.

Further, the camera system of a client device 228 may include dual rear cameras (e.g., a primary camera as well as a depth-sensing camera), or even triple, quad or penta rear camera configurations on the front and rear sides of the client device 228. These multiple cameras systems may include a wide camera, an ultra-wide camera, a telephoto camera, a macro camera and a depth sensor, for example.

The position components 1536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1502 further include communication components 1538 operable to couple the machine 1500 to a network 1522 or devices 1524 via respective coupling or connections. For example, the communication components 1538 may include a network interface Component or another suitable device to interface with the network 1522. In further examples, the communication components 1538 may include wired communication components, wireless communication components, cellular communication components, Near Field Communication (NFC) components, BLUETOOTH® components (e.g., BLUETOOTH® Low Energy), Wi-Fi© components, and other communication components to provide communication via other modalities. The devices 1524 may be another machine or any of a wide variety of peripheral devices (e.g., a peripheral device coupled via a USB).

Moreover, the communication components 1538 may detect identifiers or include components operable to detect identifiers. For example, the communication components 1538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1538, such as location via Internet Protocol (IP) geolocation, location via Wi-Fi® signal triangulation, location via detecting an NFC beacon signal that may indicate a particular location, and so forth.

The various memories (e.g., main memory 1514, static memory 1516, and memory of the processors 1504) and storage unit 1518 may store one or more sets of instructions and data structures (e.g., software) embodying or used by any one or more of the methodologies or functions described herein. These instructions (e.g., the instructions 1510), when executed by processors 1504, cause various operations to implement the disclosed examples.

The instructions 1510 may be transmitted or received over the network 1522, using a transmission medium, via a network interface device (e.g., a network interface component included in the communication components 1538) and using any one of several well-known transfer protocols (e.g., hypertext transfer protocol (HTTP)). Similarly, the instructions 1510 may be transmitted or received using a transmission medium via a coupling (e.g., a peer-to-peer coupling) to the devices 1524.

Software Architecture

Figure 16:
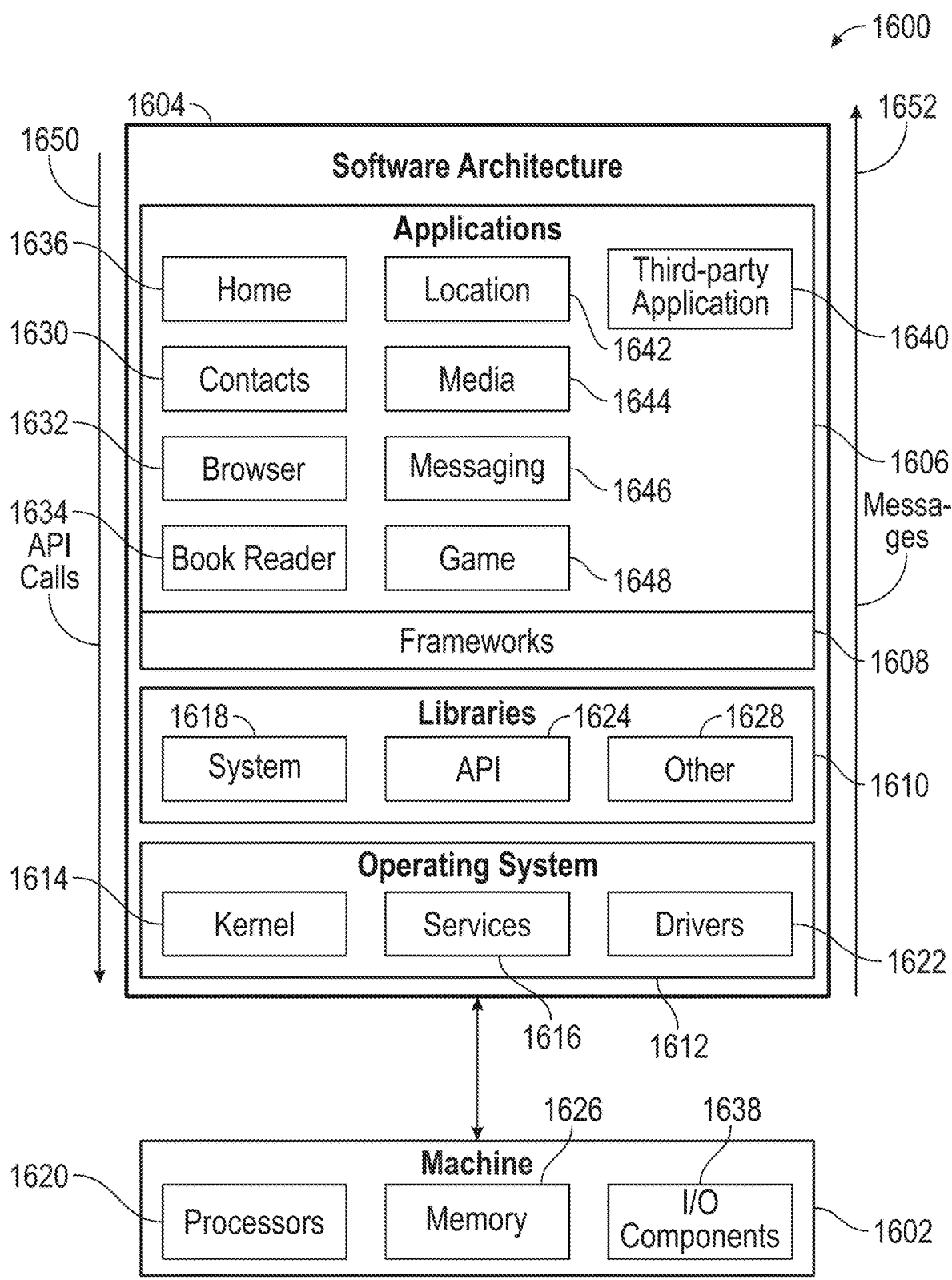
FIG. 16 is a block diagram showing a software architecture within which examples may be implemented.

FIG. 16 is a block diagram 1600 illustrating a software architecture 1604, which can be installed on any one or more of the devices described herein. The software architecture 1604 is supported by hardware such as a machine 1602 that includes processors 1620, memory 1626, and I/O components 1638. In this example, the software architecture 1604 can be conceptualized as a stack of layers, where each layer provides a particular functionality. The software architecture 1604 includes layers such as an operating system 1612, libraries 1610, frameworks 1608, and applications 1606. Operationally, the applications 1606 invoke API calls 1650 through the software stack and receive messages 1652 in response to the API calls 1650.

The operating system 1612 manages hardware resources and provides common services. The operating system 1612 includes, for example, a kernel 1614, services 1616, and drivers 1622. The kernel 1614 acts as an abstraction layer between the hardware and the other software layers. For example, the kernel 1614 provides memory management, processor management (e.g., scheduling), component management, networking, and security settings, among other functionality. The services 1616 can provide other common services for the other software layers. The drivers 1622 are responsible for controlling or interfacing with the underlying hardware. For instance, the drivers 1622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1610 provide a common low-level infrastructure used by the applications 1606. The libraries 1610 can include system libraries 1618 (e.g., C standard library) that provide functions such as memory allocation functions, string manipulation functions, mathematic functions, and the like. In addition, the libraries 1610 can include API libraries 1624 such as media libraries (e.g., libraries to support presentation and manipulation of various media formats such as Moving Picture Experts Group-4 (MPEG4), Advanced Video Coding (H.464 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1610 can also include a wide variety of other libraries 1628 to provide many other APIs to the applications 1606.

The frameworks 1608 provide a common high-level infrastructure that is used by the applications 1606. For example, the frameworks 1608 provide various graphical user interface (GUI) functions, high-level resource management, and high-level location services. The frameworks 1608 can provide a broad spectrum of other APIs that can be used by the applications 1606, some of which may be specific to a particular operating system or platform.

In an example, the applications 1606 may include a home application 1636, a contacts application 1630, a browser application 1632, a book reader application 1634, a location application 1642, a media application 1644, a messaging application 1646, a game application 1648, and a broad assortment of other applications such as a third-party application 1640. The applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party application 1640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1640 can invoke the API calls 1650 provided by the operating system 1612 to facilitate functionality described herein.

EXAMPLES

Thus, some embodiments may include one or more of the following examples.

Example 1. A method comprising: receiving, by one or more hardware processors, a request for mirrored video content, the request initiated by a user at a client device to mirror video content displayed in a screen of the client device in a mirroring lens of a wearable device, the wearable device connected to the client device by a short-range wireless connection; in response to receiving the request, communicating with a messaging application implementing at the client device to send an instruction, via the short-range wireless connection, to a realtime service implementing at the wearable device to identify and open a connection socket, the connection socket visible only in a local wireless network; based on a successful opening of the connection socket, by the one or more hardware processors, using the open connection to the local wireless network to direct a flow of mirrored video content from the client device to a mirroring lens at the wearable device; while mirrored video content is being displayed in the mirroring lens of the wearable device, tracking, by the one or more hardware processors, hand gestures of a user using the wearable device to view the mirrored video content displayed in the mirroring lens of the wearable device; processing, by the one or more hardware processors, navigational or manipulation data based on the tracked hand gestures; and sending a navigation or manipulation instruction to a lenses application to adjust a view of the mirrored video content based on the tracked hand gestures.

Example 2. The method of example 1, wherein the mirrored video content displayed in the mirroring lens of the wearable device augments a real-world view of the user wearing the wearable device, the real-world view including a real-world view of a user's hand making the tracked hand gestures.

Example 3. The method of example 1 or 2, wherein the video content displayed in the screen of the client device includes a display of an interactive user interface for receiving user inputs into the client device, and wherein the mirrored video content displayed in the mirroring lens of the wearable device includes a virtual user interface based in appearance on the interactive user interface displayed in the client device.

Example 4. The method of any one of examples 1-3, wherein the virtual user interface displayed in the mirroring lens of the wearable device is a visual replica of the interactive user interface displayed in the screen of the client device.

Example 5. The method of any one of examples 1-4, wherein an identified hand gesture among the hand gestures tracked by the one or more hardware processors is associated with a desired user navigation or manipulation of the virtual user interface displayed in the mirroring lens of the wearable device, and wherein a navigation or manipulation instruction based on the desired user navigation or manipulation is included in the navigation or manipulation instruction to the client device or a mirroring lens processor of the wearable device.

Example 6. The method of any one of examples 1-5, wherein the navigation or manipulation instruction based on the identified hand gesture is associated with one or more of a hover, a resize, a reorientation, a rotation, and a repositioning of the virtual user interface displayed in the mirroring lens of the wearable device.

Example 7. The method of any one of examples 1-6, further comprising causing or performing, by the one or more hardware processors, a navigation or manipulation of the virtual user interface displayed in the mirroring lens of the wearable device based on a received navigation or manipulation instruction.

Example 8. The method of any one of examples 1-7, wherein the identified hand gesture includes a finger pinch hand gesture.

Example 9. The method of any one of examples 1-8, wherein the identified hand gesture includes a single hand gesture.

Example 10. The method of any one of examples 1-9, wherein the identified hand gesture includes a double-handed gesture.

Example 11. The method of any one of examples 1-10, further comprising, based on an unsuccessful opening of the connection socket, causing an automatic fallback connection to a proxy local wireless network to direct a flow of mirrored video content from the client device to the lenses application.

Example 12. A system comprising: a processor implementing a local wireless network; and a memory including instructions that, when executed by the processor, cause the processor to perform operations comprising: receiving, by one or more hardware processors, a request for mirrored video content, the request initiated by a user at a client device to mirror video content displayed in a screen of the client device in a mirroring lens of a wearable device, the wearable device connected to the client device by a short-range wireless connection; in response to receiving the request, communicating with a messaging application implementing at the client device to send an instruction, via the short-range wireless connection, to a realtime service implementing at the wearable device to identify and open a connection socket, the connection socket visible only in a local wireless network; based on a successful opening of the connection socket, by the one or more hardware processors, using the open connection to the local wireless network to direct a flow of mirrored video content from the client device to a mirroring lens at the wearable device; while mirrored video content is being displayed in the mirroring lens of the wearable device, tracking, by the one or more hardware processors, hand gestures of a user using the wearable device to view the mirrored video content displayed in the mirroring lens of the wearable device; processing, by the one or more hardware processors, navigational or manipulation data based on the tracked hand gestures; and sending a navigation or manipulation instruction to a lenses application to adjust a view of the mirrored video content based on the tracked hand gestures.

Example 13. The system of example 12, wherein the mirrored video content displayed in the mirroring lens of the wearable device augments a real-world view of the user wearing the wearable device, the real-world view including a real-world view of a user's hand making the tracked hand gestures.

Example 14. The system of example 12 or 13, wherein the video content displayed in the screen of the client device includes a display of an interactive user interface for receiving user inputs into the client device, and wherein the mirrored video content displayed in the mirroring lens of the wearable device includes a virtual user interface based in appearance on the interactive user interface displayed in the client device.

Example 15. The system of any one of examples 12-14, wherein the virtual user interface displayed in the mirroring lens of the wearable device is a visual replica of the interactive user interface displayed in the screen of the client device.

Example 16. The system of any one of examples 12-15, wherein an identified hand gesture among the hand gestures tracked by the one or more hardware processors is associated with a desired user navigation or manipulation of the virtual user interface displayed in the mirroring lens of the wearable device, and wherein a navigation or manipulation instruction based on the desired user navigation or manipulation is included in the navigation or manipulation instruction to the client device or a mirroring lens processor of the wearable device.

Example 17. The system of any one of examples 12-16, wherein the navigation or manipulation instruction based on the identified hand gesture is associated with one or more of a hover, a resize, a reorientation, a rotation, and a repositioning of the virtual user interface displayed in the mirroring lens of the wearable device.

Example 18. The system of any one of examples 12-17, wherein the operations further comprise causing or performing, by the one or more hardware processors, a navigation or manipulation of the virtual user interface displayed in the mirroring lens of the wearable device based on a received navigation or manipulation instruction.

Example 19. The system of any one of examples 12-18, wherein the identified hand gesture includes one of a finger pinch hand gesture, a single hand gesture, or a double-handed gesture.

Example 20. A non-transitory computer-readable medium comprising instructions, which when executed by a computing device, cause the computing device to perform operations comprising: receiving, by one or more hardware processors, a request for mirrored video content, the request initiated by a user at a client device to mirror video content displayed in a screen of the client device in a mirroring lens of a wearable device, the wearable device connected to the client device by a short-range wireless connection; in response to receiving the request, communicating with a messaging application implementing at the client device to send an instruction, via the short-range wireless connection, to a realtime service implementing at the wearable device to identify and open a connection socket, the connection socket visible only in a local wireless network; based on a successful opening of the connection socket, by the one or more hardware processors, using the open connection to the local wireless network to direct a flow of mirrored video content from the client device to a mirroring lens at the wearable device; while mirrored video content is being displayed in the mirroring lens of the wearable device, tracking, by the one or more hardware processors, hand gestures of a user using the wearable device to view the mirrored video content displayed in the mirroring lens of the wearable device; processing, by the one or more hardware processors, navigational or manipulation data based on the tracked hand gestures; and sending a navigation or manipulation instruction to a lenses application to adjust a view of the mirrored video content based on the tracked hand gestures.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more hardware processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more hardware processors. Similarly, the methods described herein may be at least partially processor-implemented, with a particular processor or processors being an example of hardware. For example, at least some of the operations of a method may be performed by one or more hardware processors or processor-implemented components.

Moreover, the one or more hardware processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:

receiving, by one or more hardware processors, a request for mirrored video content, the request initiated by a user at a client device to mirror video content displayed in a screen of the client device in a mirroring lens of a wearable device, the wearable device connected to the client device by a short-range wireless connection;

in response to receiving the request, communicating with a messaging application implementing at the client device to send an instruction, via the short-range wireless connection, to a realtime service implementing at the wearable device to identify and open a connection socket, the connection socket visible only in a local wireless network;

based on a successful opening of the connection socket, by the one or more hardware processors, using the open connection to the local wireless network to direct a flow of mirrored video content from the client device to a mirroring lens at the wearable device;

while mirrored video content is being displayed in the mirroring lens of the wearable device, tracking, by the one or more hardware processors, hand gestures of a user using the wearable device to view the mirrored video content displayed in the mirroring lens of the wearable device;

processing, by the one or more hardware processors, navigational or manipulation data based on the tracked hand gestures;

sending a navigation or manipulation instruction to a lenses application to adjust a view of the mirrored video content based on the tracked hand gestures; and causing an automatic fallback connection to a proxy local wireless network to direct a flow of mirrored video content from the client device to the lenses application in the event of an unsuccessful opening of the connection socket.

2. The method of claim 1, wherein the mirrored video content displayed in the mirroring lens of the wearable device augments a real-world view of the user wearing the wearable device, the real-world view including a real-world view of a user's hand making the tracked hand gestures.

3. The method of claim 2, wherein the video content displayed in the screen of the client device includes a display of an interactive user interface for receiving user inputs into the client device, and wherein the mirrored video content displayed in the mirroring lens of the wearable device includes a virtual user interface based in appearance on the interactive user interface displayed in the client device.

4. The method of claim 3, wherein the virtual user interface displayed in the mirroring lens of the wearable device is a visual replica of the interactive user interface displayed in the screen of the client device.

5. The method of claim 4, wherein an identified hand gesture among the hand gestures tracked by the one or more hardware processors is associated with a desired user navigation or manipulation of the virtual user interface displayed in the mirroring lens of the wearable device, and wherein a navigation or manipulation instruction based on the desired user navigation or manipulation is included in the navigation or manipulation instruction to the client device or a mirroring lens processor of the wearable device.

6. The method of claim 5, wherein the navigation or manipulation instruction based on the identified hand gesture is associated with one or more of a hover, a resize, a reorientation, a rotation, and a repositioning of the virtual user interface displayed in the mirroring lens of the wearable device.

7. The method of claim 6, further comprising causing or performing, by the one or more hardware processors, a navigation or manipulation of the virtual user interface displayed in the mirroring lens of the wearable device based on a received navigation or manipulation instruction.

8. The method of claim 7, wherein the identified hand gesture includes a finger pinch hand gesture.

9. The method of claim 7, wherein the identified hand gesture includes a single hand gesture.

10. The method of claim 7, wherein the identified hand gesture includes a double-handed gesture.

11. A system comprising:

a processor implementing a local wireless network; and a memory including instructions that, when executed by the processor, cause the processor to perform operations comprising:

receiving, by one or more hardware processors, a request for mirrored video content, the request initiated by a user at a client device to mirror video content displayed in a screen of the client device in a mirroring lens of a wearable device, the wearable device connected to the client device by a short-range wireless connection;

in response to receiving the request, communicating with a messaging application implementing at the client device to send an instruction, via the short-range wireless connection, to a realtime service implementing at the wearable device to identify and open a connection socket, the connection socket visible only in a local wireless network;

based on a successful opening of the connection socket, by the one or more hardware processors, using the open connection to the local wireless network to direct a flow of mirrored video content from the client device to a mirroring lens at the wearable device;

while mirrored video content is being displayed in the mirroring lens of the wearable device, tracking, by the one or more hardware processors, hand gestures of a user using the wearable device to view the mirrored video content displayed in the mirroring lens of the wearable device;

processing, by the one or more hardware processors, navigational or manipulation data based on the tracked hand gestures;

sending a navigation or manipulation instruction to a lenses application to adjust a view of the mirrored video content based on the tracked hand gestures; and causing an automatic fallback connection to a proxy local wireless network to direct a flow of mirrored video content from the client device to the lenses application in the event of an unsuccessful opening of the connection socket.

12. The system of claim 11, wherein the mirrored video content displayed in the mirroring lens of the wearable device augments a real-world view of the user wearing the wearable device, the real-world view including a real-world view of a user's hand making the tracked hand gestures.

13. The system of claim 12, wherein the video content displayed in the screen of the client device includes a display of an interactive user interface for receiving user inputs into the client device, and wherein the mirrored video content displayed in the mirroring lens of the wearable device includes a virtual user interface based in appearance on the interactive user interface displayed in the client device.

14. The system of claim 13, wherein the virtual user interface displayed in the mirroring lens of the wearable device is a visual replica of the interactive user interface displayed in the screen of the client device.

15. The system of claim 14, wherein an identified hand gesture among the hand gestures tracked by the one or more hardware processors is associated with a desired user navigation or manipulation of the virtual user interface displayed in the mirroring lens of the wearable device, and wherein a navigation or manipulation instruction based on the desired user navigation or manipulation is included in the navigation or manipulation instruction to the client device or a mirroring lens processor of the wearable device.

16. The system of claim 15, wherein the navigation or manipulation instruction based on the identified hand gesture is associated with one or more of a hover, a resize, a reorientation, a rotation, and a repositioning of the virtual user interface displayed in the mirroring lens of the wearable device.

17. The system of claim 16, wherein the operations further comprise causing or performing, by the one or more hardware processors, a navigation or manipulation of the virtual user interface displayed in the mirroring lens of the wearable device based on a received navigation or manipulation instruction.

18. The system of claim 17, wherein the identified hand gesture includes one of a finger pinch hand gesture, a single hand gesture, or a double-handed gesture.

19. A non-transitory computer-readable medium comprising instructions, which when executed by a computing device, cause the computing device to perform operations comprising:

receiving, by one or more hardware processors, a request for mirrored video content, the request initiated by a user at a client device to mirror video content displayed in a screen of the client device in a mirroring lens of a wearable device, the wearable device connected to the client device by a short-range wireless connection;

in response to receiving the request, communicating with a messaging application implementing at the client device to send an instruction, via the short-range wireless connection, to a realtime service implementing at the wearable device to identify and open a connection socket, the connection socket visible only in a local wireless network;

based on a successful opening of the connection socket, by the one or more hardware processors, using the open connection to the local wireless network to direct a flow of mirrored video content from the client device to a mirroring lens at the wearable device;

while mirrored video content is being displayed in the mirroring lens of the wearable device, tracking, by the one or more hardware processors, hand gestures of a user using the wearable device to view the mirrored video content displayed in the mirroring lens of the wearable device;

processing, by the one or more hardware processors, navigational or manipulation data based on the tracked hand gestures;

sending a navigation or manipulation instruction to a lenses application to adjust a view of the mirrored video content based on the tracked hand gestures; and causing an automatic fallback connection to a proxy local wireless network to direct a flow of mirrored video content from the client device to the lenses application in the event of an unsuccessful opening of the connection socket.

* * * * *